United States Patent
Salsbury et al.

(10) Patent No.: US 10,962,938 B2
(45) Date of Patent: Mar. 30, 2021

(54) BUILDING MANAGEMENT SYSTEM WITH SELF-OPTIMIZING CONTROL, PERFORMANCE MONITORING, AND FAULT DETECTION

(71) Applicant: Johnson Controls Technology Company, Auburn Hills, MI (US)

(72) Inventors: Timothy I. Salsbury, Mequon, WI (US); Carlos Felipe Alcala Perez, Milwaukee, WI (US); John M. House, Saint-Leonard (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/379,742

(22) Filed: Apr. 9, 2019

(65) Prior Publication Data

US 2020/0326666 A1 Oct. 15, 2020

(51) Int. Cl.
| | | |
|---|---|---|
| G05B 23/00 | (2006.01) | |
| G05B 13/02 | (2006.01) | |
| G05B 23/02 | (2006.01) | |
| G05B 21/02 | (2006.01) | |
| G05B 15/02 | (2006.01) | |

(52) U.S. Cl.
CPC ....... G05B 13/023 (2013.01); G05B 23/0216 (2013.01); *G05B 15/02* (2013.01); *G05B 21/02* (2013.01)

(58) Field of Classification Search
None
See application file for complete search history.

(56) References Cited

U.S. PATENT DOCUMENTS

| | | | | |
|---|---|---|---|---|
| 2009/0083583 | A1* | 3/2009 | Seem | G05B 5/01 |
| | | | | 714/39 |
| 2011/0276180 | A1* | 11/2011 | Seem | G05B 13/0265 |
| | | | | 700/275 |

OTHER PUBLICATIONS

U.S. Appl. No. 16/131,927, filed Sep. 14, 2018, Johnson Controls Technology Company.

\* cited by examiner

Primary Examiner — Paul B Yanchus, III
(74) Attorney, Agent, or Firm — Foley & Lardner LLP

(57) ABSTRACT

A building management system includes building equipment configured to operate in accordance with an input to alter a variable state or condition of a building, a feedback controller configured to generate the input as a function of a measured state of the building equipment, and an analytics circuit. The analytics circuit is configured to obtain and store a dataset comprising the measured state and the input for a plurality of time steps, determine, based on at least a portion of the dataset, a self-optimizing control function that defines a self-optimizing control variable as a function of the measured state, calculate a value of the self-optimizing control variable using the self-optimizing control function and the measured state, monitor the value of the self-optimizing control variable over time, and generate an indication of performance of the building equipment relative to optimal performance based on the value of the self-optimizing control variable.

20 Claims, 20 Drawing Sheets

BUILDING MANAGEMENT SYSTEM WITH SELF-OPTIMIZING CONTROL, PERFORMANCE MONITORING, AND FAULT DETECTION

BACKGROUND

Systems in buildings are primarily controlled to maintain comfort conditions for occupants. The complexity and redundancy present in most building systems make it possible to satisfy comfort conditions in a myriad of different ways. One example of this is when cold air is circulated through a room to meet a temperature setpoint. In this case, the setpoint could be maintained through different combinations of supply air temperature and volume, e.g., room temperatures could be lowered by either increasing air flow or reducing the temperature of the supply air. The cost of air flow is governed by the fan and the cost of lowering the air temperature is dominated in most cooling applications by compressor energy. A trade-off therefore exists that can be exploited in order to minimize total costs whilst still satisfying comfort.

The trade-offs inherent in building systems can be managed by applying optimization methods that make adjustments to system operation. For the air flow example, the temperature of the air delivered to the room is usually controlled to a fixed setpoint. Conventional feedback control structures are usually designed for regulation to constant setpoints, which satisfies control objectives but leads to optimization cost function measures varying with system operating points and disturbances. An optimization method could be used to adjust this setpoint to minimize the total cost of the fans and chiller plant. This situation is common in complex systems where a network of controllers operate to maintain setpoints and an optimization method is used to adjust the setpoints based on a desired cost function. Standard terminology for the optimization functionality is "real-time optimization layer" (RTO layer). An RTO layer may increase the computational requirements of building systems and increase system complexity.

An alternative approach known as self-optimizing control (SOC) was developed by recognizing that the RTO layer is only needed because the control layer that includes the feedback controllers essentially controls the wrong variables from a holistic control and optimization perspective. The purpose of SOC is to design the control structure so that regulation at constant setpoints maintains not only control objectives but also optimization targets.

SUMMARY

One implementation of the present disclosure is a building management system. The building management system includes building equipment configured to operate in accordance with an input to alter a variable state or condition of a building, a feedback controller configured to generate the input as a function of a measured state of the building equipment, and an analytics circuit. The analytics circuit is configured to obtain and store a dataset comprising the measured state of the building equipment and the input for a plurality of time steps, determine, based on at least a portion of the dataset, a self-optimizing control function that defines a self-optimizing control variable as a function of the measured state of the building equipment, calculate a value of the self-optimizing control variable using the self-optimizing control function and the measured state, monitor the value of the self-optimizing control variable over time, and generate an indication of performance of the building equipment relative to optimal performance based on the value of the self-optimizing control variable.

In some embodiments, the feedback controller is configured to modify an operation of the building equipment in response to the indication. In some embodiments, the building management system includes a display device configured to receive the indication and display a graphical representation of the indication to a user.

In some embodiments, the analytics circuit is configured to detect a fault based on a change in the value of the self-optimizing control variable and the indication comprises information relating to the fault. In some embodiments, the analytics circuit is configured to determine that the building equipment are performing optimally in response to the self-optimizing control variable having a value of substantially zero.

In some embodiments, operating the building equipment incurs a cost defined by a cost function of the input. The analytics circuit is configured to determine the self-optimizing control function such that the self-optimizing control variable represents a derivative of the cost function with respect to the input.

In some embodiments, the self-optimizing control function includes multiplying the measured state by a matrix and adding an offset vector. The analytics circuit is configured to determine values of elements of the matrix and the offset vector using a non-optimal reference.

Another implementation of the present disclosure is a method. The method includes operating building equipment in accordance with an input to alter a variable state or condition of a building, generating the input as a function of a measured state of the building equipment, providing the input to the building equipment, obtaining and storing a dataset comprising the measured state of the building equipment and the input for a plurality of time steps, determining, based on at least a portion of the dataset, a self-optimizing control function that defines a self-optimizing control variable as a function of the measured state of the building equipment, calculating a value of the self-optimizing control variable using the self-optimizing control function and the measured state, monitoring the value of the self-optimizing control variable over time, and generating an indication of performance of the building equipment relative to optimal performance based on the value of the self-optimizing control variable.

In some embodiments, the method includes modifying an operation of the building equipment in response to the indication. In some embodiments, the method includes displaying a graphical representation of the indication on a display screen.

In some embodiments, the method includes detecting a fault based on a change in the value of the self-optimizing control variable. The indication includes information relating to the fault. In some embodiments, the method includes determining that the building equipment are performing optimally in response to calculating a zero value of the self-optimizing control variable.

In some embodiments, operating the building equipment incurs a cost defined by a cost function of the input. Determining the self-optimizing control function includes defining the self-optimizing control variable as a derivative of the cost function with respect to the input. In some embodiments, the self-optimizing control function includes multiplying the measured state by a matrix and adding an offset vector. Determining the self-optimizing control function includes determining values of elements of the matrix and the offset vector using a non-optimal reference.

Another implementation of the present disclosure is one or more non-transitory computer-readable media containing program instructions that, when executed by one or more processors, cause the one or more processors to perform operations. The operations include obtaining a dataset comprising a measured state of building equipment for a plurality of time steps and an input to the building equipment for the plurality of time steps. The building equipment is configured to operate as controlled by the input. The operations also include determining, based on at least a portion of the dataset, a self-optimizing control function that defines a self-optimizing control variable as a function of the measured state of the building equipment, obtaining a current value of the measured state of the building equipment, calculating a value of the self-optimizing control variable using the function and the current value of the measured state, generating an indication of performance of the building equipment relative to optimal performance based on the value of the self-optimizing control variable, and one or more of modifying an operation of the building equipment in response to the indication or generating a graphical representation of the indication and causing the graphical representation to be displayed by a user device.

In some embodiments, the operations included detecting a fault based on a change in the value of the self-optimizing control variable. The indication comprises information relating to the fault. In some embodiments, detecting the fault comprises determining that the current value of the self-optimizing control variable has an absolute value exceeding a threshold value.

In some embodiments, the self-optimizing control function includes multiplying the measured state by a matrix and adding an offset vector. Determining the self-optimizing control function comprises determining values of elements of the matrix and the offset vector using a non-optimal reference.

In some embodiments, obtaining the dataset comprises conducting a test by generating a modified input for each of the plurality of time steps and controlling the building equipment to operate in accordance with the modified input.

DETAILED DESCRIPTION

Building HVAC Systems and Building Management Systems

Figure 1:
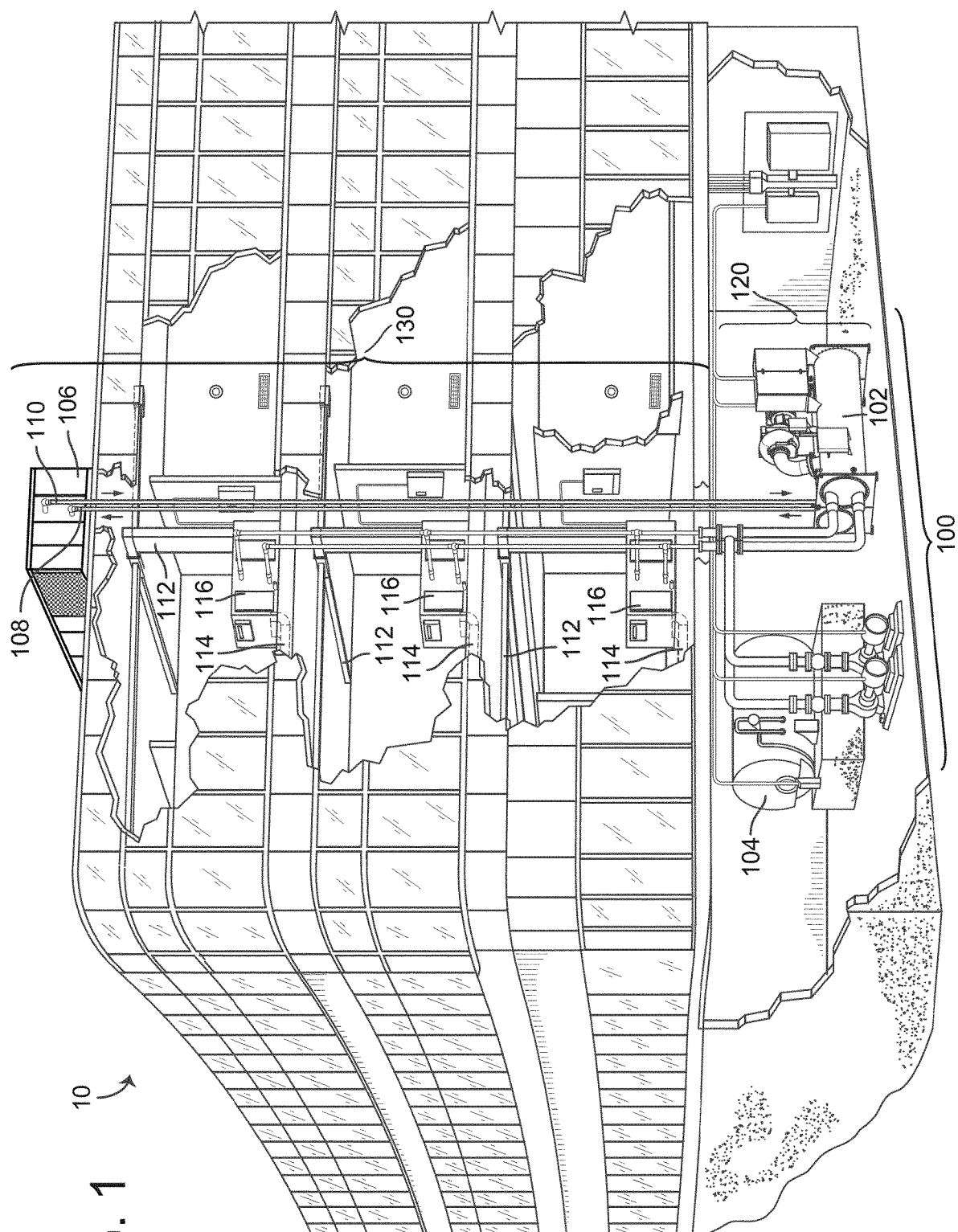
FIG. 1 is a drawing of a building equipped with a HVAC system, according to some embodiments.
Figure 2:
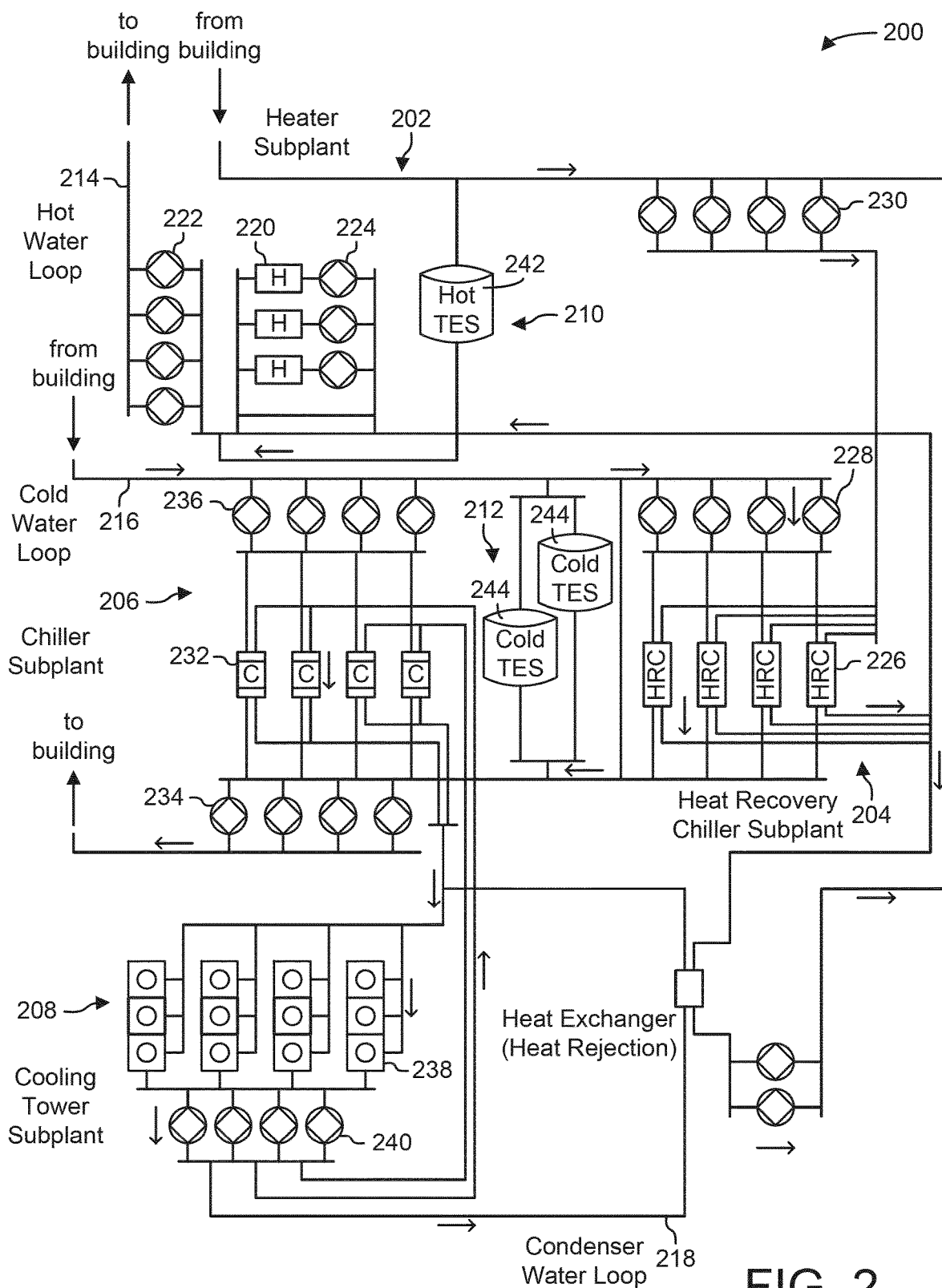
FIG. 2 is a block diagram of a waterside system which can be used to serve the building of FIG. 1, according to some embodiments.
Figure 3:
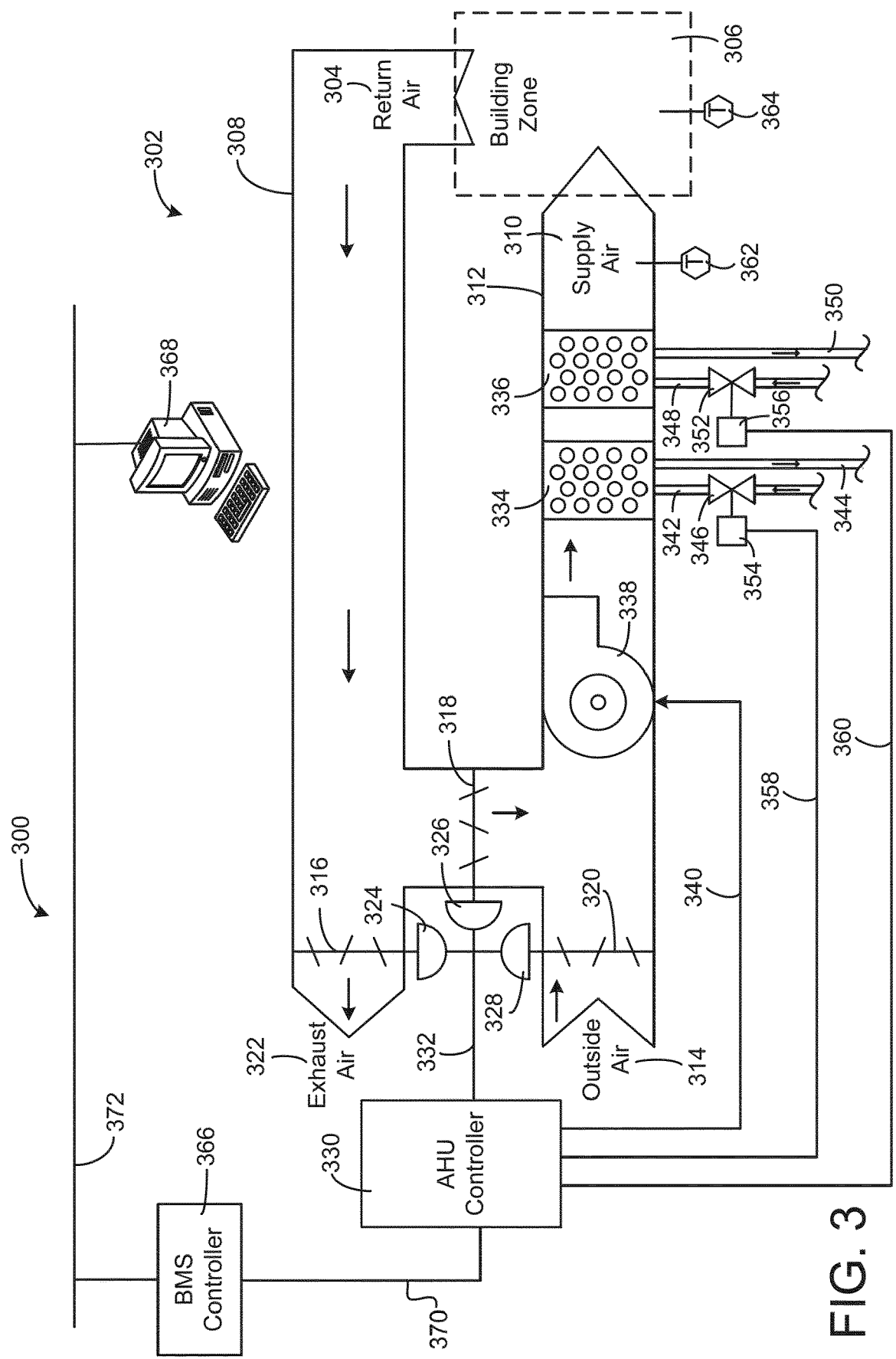
FIG. 3 is a block diagram of an airside system which can be used to serve the building of FIG. 1, according to some embodiments.
Figure 4:
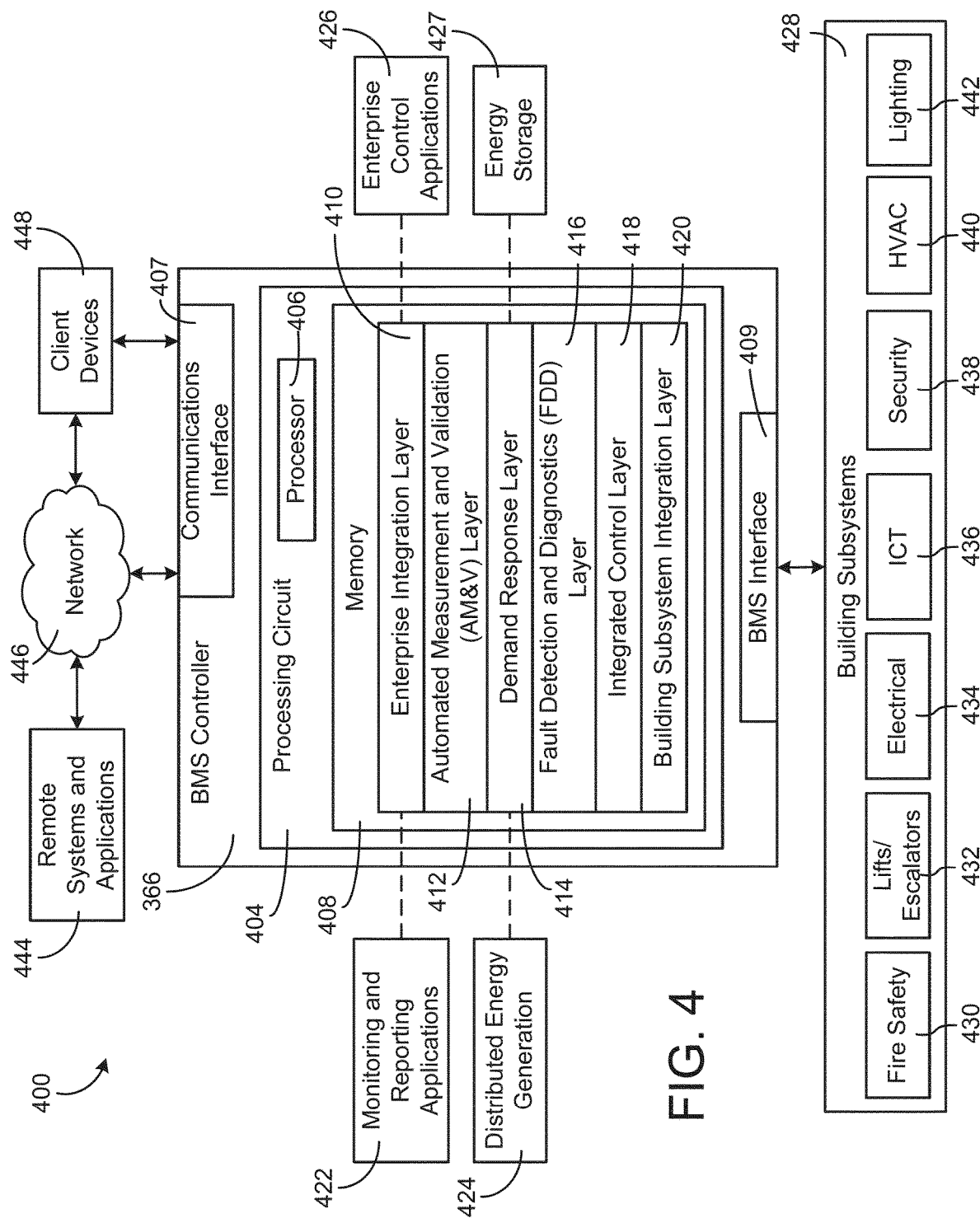
FIG. 4 is a block diagram of a building management system (BMS) which can be used to monitor and control the building of FIG. 1, according to some embodiments.
Figure 5:
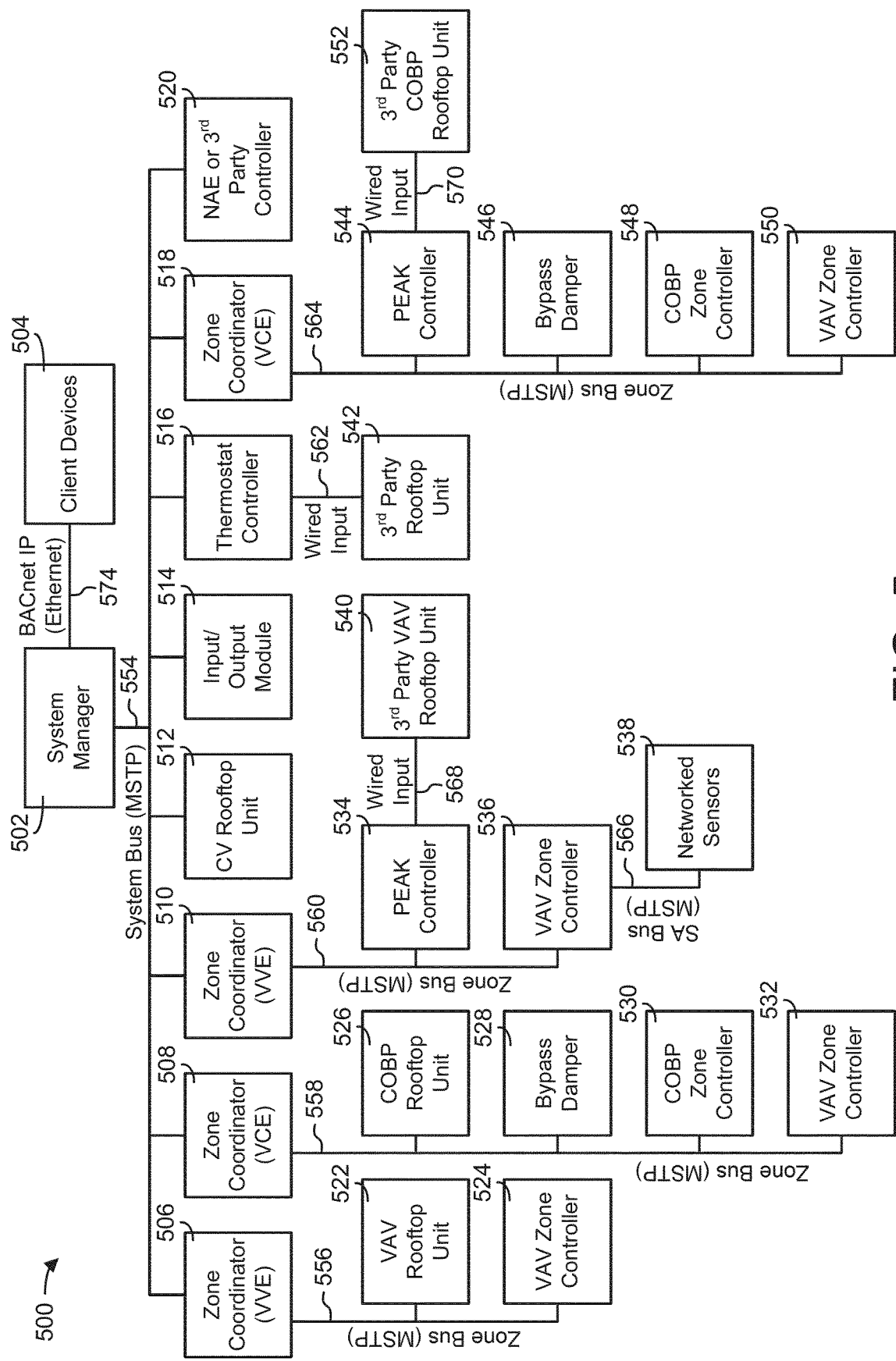
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Self-Optimizing Control
Self-Optimizing Control Structure

Figure 6:
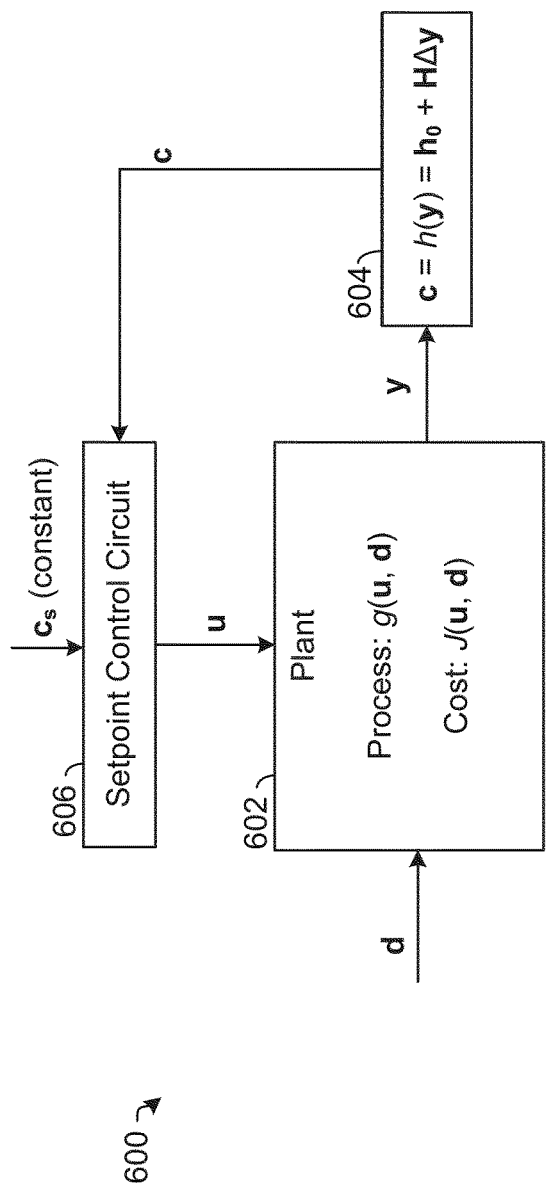
FIG. 6 is a block diagram of a self-optimizing control process, according to some embodiments.

Referring now to FIG. 6, an illustration of a control structure 600 for self-optimizing control (SOC) is shown, according to some embodiments. As shown in FIG. 6 and described in detail below, the control structure 600 is configured such that both control and optimization objectives are satisfied simultaneously through the regulatory action of a feedback controller. In other words, SOC is a control scheme that uses a combination of measured variables to create new variables that, when kept at a constant setpoint, keeps the controlled system at optimal or near-optimal operating conditions regardless of disturbances in the system. SOC is described in detail in U.S. patent application Ser. No. 16/131,927, filed Sep. 14, 2018, which is hereby incorporated by reference herein in its entirety.

As shown in FIG. 6, a plant 602 is provided with an input u. The plant 602 may include various building equipment serving one or more zones of a building, for example as shown in FIGS. 1-5. The plant 602 is also subject to a disturbance d, for example an outside air temperature or other external condition. The plant 602 produces an output y following a controlled process characterized by y=g(u,d). The process has an operating cost given by a function J(u,d). The measurements y are used to calculate a variable c at box 604. The variable c is fed to a setpoint control circuit 606 that keeps c at a setpoint $c_s$. In order to keep c at a setpoint $c_s$, the setpoint control circuit 606 is configured to calculate values of u that, when applied to the process, will make the cost J(u,d) move to, or very close to, its optimal value $J^{opt}(u,d)$. The control loop illustrated by the control structure 600 is thereby established.

The key to the self-optimizing control structure 600 illustrated in FIG. 6 is the creation of the set of control variables c. These variables are derived from a linear (or non-linear) mapping of available measurements (i.e., from y). In existing approaches, the mapping is typically obtained from operational data obtained at optimal operating points. However, acquiring optimal operating data may require application of an RTO layer to control the system to an optimal operating point, potentially re-introducing the RTO complexity that SOC may be intended to replace. In some cases, such an optimal operating point may be difficult to obtain. Accordingly, SOC approaches that require optimal operating data may have limited utility in real-world applications.

The systems and methods disclosed herein enable the mapping function to be obtained without the need for optimal data. Instead, as described in detail below, the systems and methods disclosed herein enable the mapping function to be obtained using normal operating data across a range of conditions.

Still referring to FIG. 6, the variable c, referred to herein as the self-optimizing (SO) variable or SOC variable, can be thought of as the gradient of the cost function J(u,d) with respect to u. In a data-driven approach, c can be calculated in general as a linear combination of the measured variables as $c = h_0 + H\Delta y$, where $h_0$ is an offset vector of size $n_u$ and H is an $n_u \times n_y$ matrix. The dimension $n_u$ is the number of input variables $u_i$ in the input vector u, and $n_y$ is the number of outputs, or measured variables, $y_i$ in the output vector y. The dimension $n_d$ is the number of disturbances $d_i$ the disturbance vector d. The number of measurements $n_y$ should be equal or greater than the number of inputs $n_u$ plus the number of disturbances $n_d$, i.e., $n_y \geq n_u + n_d$. Furthermore, $\Delta y = y - y^*$, where $y^*$ is a reference, or nominal, point from which the parameters $h_0$ and H are calculated. The derivation of c is included below.

In the notation of the present disclosure, different superscripts are used to differentiate the nominal operating conditions. Any nominal point is referred to with the superscript * (e.g., $y^*$), an optimal nominal point is referred to with the superscript opt (e.g., $y^{opt}$), and any non-optimal reference point is referred to with the superscript r (e.g., $y^r$). In the existing literature, the reference point $y^*$ is selected as the optimal operating condition $y^{opt}$ of the plant for a given disturbance. As noted above, the present disclosure extends that point to be any non-saturated operating condition, i.e., a non-optimal operating condition.

For a given disturbance $d^*$ the plant 602 has an optimal cost $J^{opt}(u^{opt}, d^*)$ and an optimal input $u^{opt}$. The optimal input can be found with an optimizer (e.g., an RTO layer), for example an Extremum Seeking Controller (ESC). The optimal output of the process is $y^{opt} = g(u^{opt}, d^*)$ which is used as a reference point in the design of the SOC controller in the existing literature. In such a case, since the variable c is the gradient of the cost function with respect to the process input, at the optimal operating condition this value of c should be zero (i.e., when $y=y^{opt}$, c=0) and, accordingly, the offset $h_0=0$. This means that for an optimal reference point, the SO variable c is calculated as $c=H\Delta y$. This is the expression for c found in the existing literature. However, in many cases optimal data are not available, rendering the existing approach difficult or impossible to implement in practice.

In the approach disclosed herein, any operating condition can be used to calculate the SO variable from non-optimal data. A non-optimal input $u^r$ will produce the output $y^r = g(u^r, d^*)$. This output may be used as the reference point $y^* = y^r$. In this approach, the only requirement is that the input $u^r$ is not at a constraint. The SO variable is then calculated as $c=h_0+H\Delta y$ with $\Delta y = y - y^r$. Accordingly, the term $h_0$ is new in the approach presented herein relative to the existing literature. As illustrated in FIG. 6, $c=h_0+H\Delta y$ is the function used herein for calculating the SO variable c based on the output y.

Derivation of the Self-Optimizing Variable c

The following paragraphs provide a derivation of the function used to calculate the SO variable c in the non-optimal data-driven approach of the present embodiment. Using a second-order Taylor approximation, the cost function J(u,d) can be approximated around the disturbance $d^*$ and the general reference input $u^*$ as $$\Delta J = \begin{bmatrix} J_u^* \\ J_d^* \end{bmatrix}^T \begin{bmatrix} \Delta u \\ \Delta d \end{bmatrix} + \frac{1}{2} \begin{bmatrix} \Delta u \\ \Delta d \end{bmatrix}^T \begin{bmatrix} J_{uu}^* & J_{ud}^* \\ J_{du}^* & J_{dd}^* \end{bmatrix} \begin{bmatrix} \Delta u \\ \Delta d \end{bmatrix}$$

where $\Delta u = u - u^*$, $\Delta d = d - d^*$, $\Delta J = J(u,d) - J(u^*, d^*)$, $$J_u^* = \frac{\partial J}{\partial u}\bigg|_{u=u^*, d=d^*}, \ J_d^* = \frac{\partial J}{\partial d}\bigg|_{u=u^*, d=d^*}, \ J_{uu}^* = \frac{\partial^2 J}{\partial u \partial u^T}\bigg|_{u=u^*, d=d^*},$$

$$J_{ud}^* = \frac{\partial^2 J}{\partial u \partial d^T}\bigg|_{u=u^*, d=d^*}, \ J_{du}^* = \frac{\partial^2 J}{\partial d \partial u^T}\bigg|_{u=u^*, d=d^*},$$

-continued $$J_{dd}^* = \frac{\partial^2 J}{\partial d \partial d^T}\bigg|_{u=u^*, d=d^*}.$$

Furthermore, the gradient of the cost function with respect to u, $J_u$, can be approximated as $$J_u = J_u^* + [J_{uu}^* \quad J_{ud}^*]\begin{bmatrix} \Delta u \\ \Delta d \end{bmatrix}.$$

In general, the disturbance $\Delta d$ cannot be measured directly. The disturbance $\Delta d$ can, however, be calculated from the process measurements. The measurements y can be approximated around the reference point as:

$$\Delta y = [G_u^* \quad G_d^*]\begin{bmatrix} \Delta u \\ \Delta d \end{bmatrix}$$

where $\Delta y = y - y^*$ is the deviation from the reference point, and $$G_u^* = \frac{\partial y}{\partial u^T}\bigg|_{u=u^*, d=d^*} \text{ and}$$

$$G_d^* = \frac{\partial y}{\partial d^T}\bigg|_{u=u^*, d=d^*}$$

are the static gains of the measurements y with respect to the inputs u and disturbance d, respectively. Making $G_y = [G_u^* \; G_d^*]$ we get $$\begin{bmatrix} \Delta u \\ \Delta d \end{bmatrix} = G_y^+ \Delta y.$$

The term $G_y^+$ is the pseudo-inverse of $G_y$.

Substitution in $J_u$ leads to $J_u = J_u^* + [J_{uu}^* J_{ud}^*] G_y^+ \Delta Y$. This expression has the same form as $c = h_0 + H\Delta y$. Thus, c can be defined as the gradient of J with respect to u, evaluated at $u^*$, which leads to $$h_0 = J_u^*;$$

$$H = [J_{uu}^* J_{ud}^*] G_y^+$$

where $c = h_0 + H\Delta y$.

Figure 8:
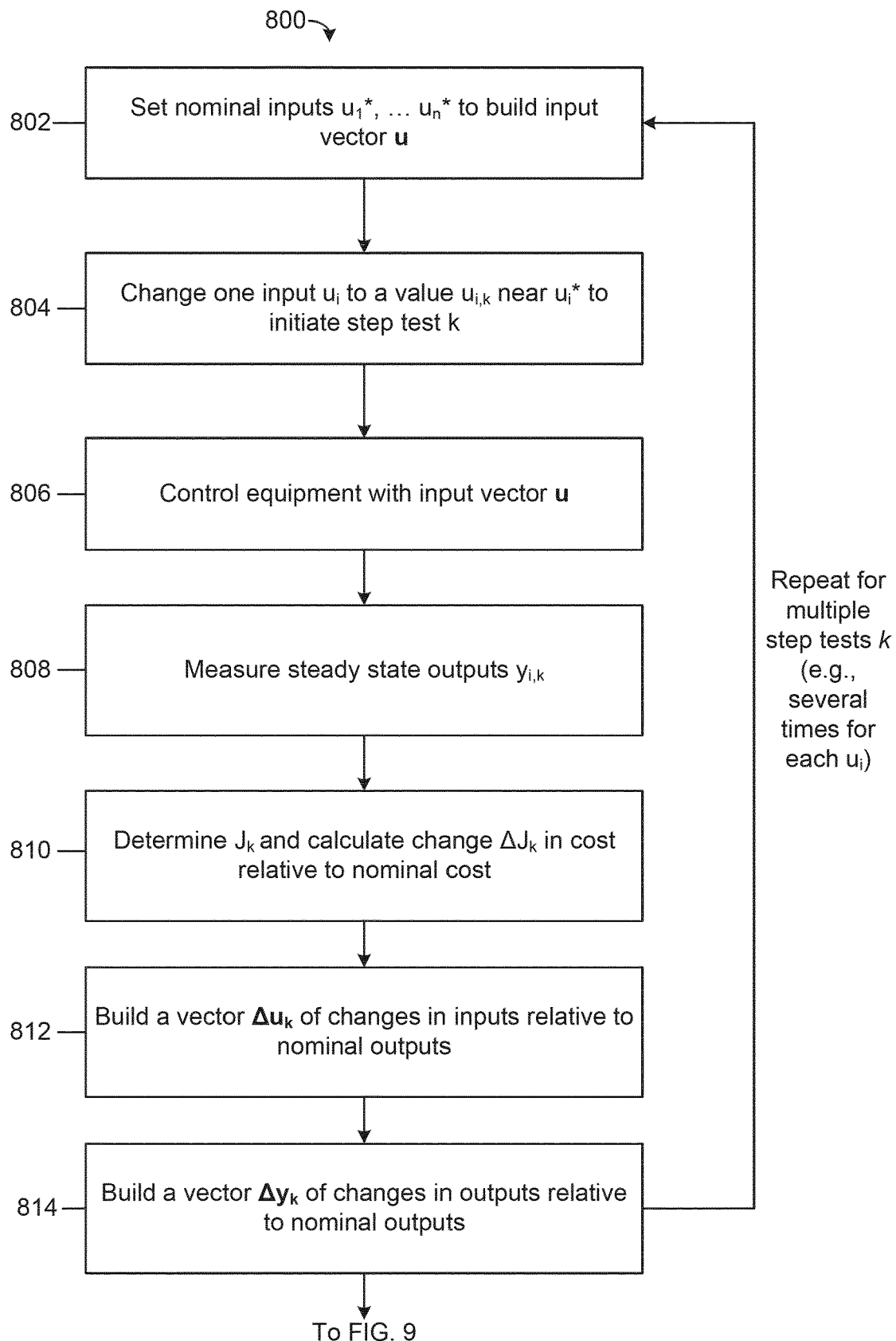
FIG. 8 is a flowchart of a first part of a process for identifying a self-optimizing control function, according to some embodiments.
Figure 9:
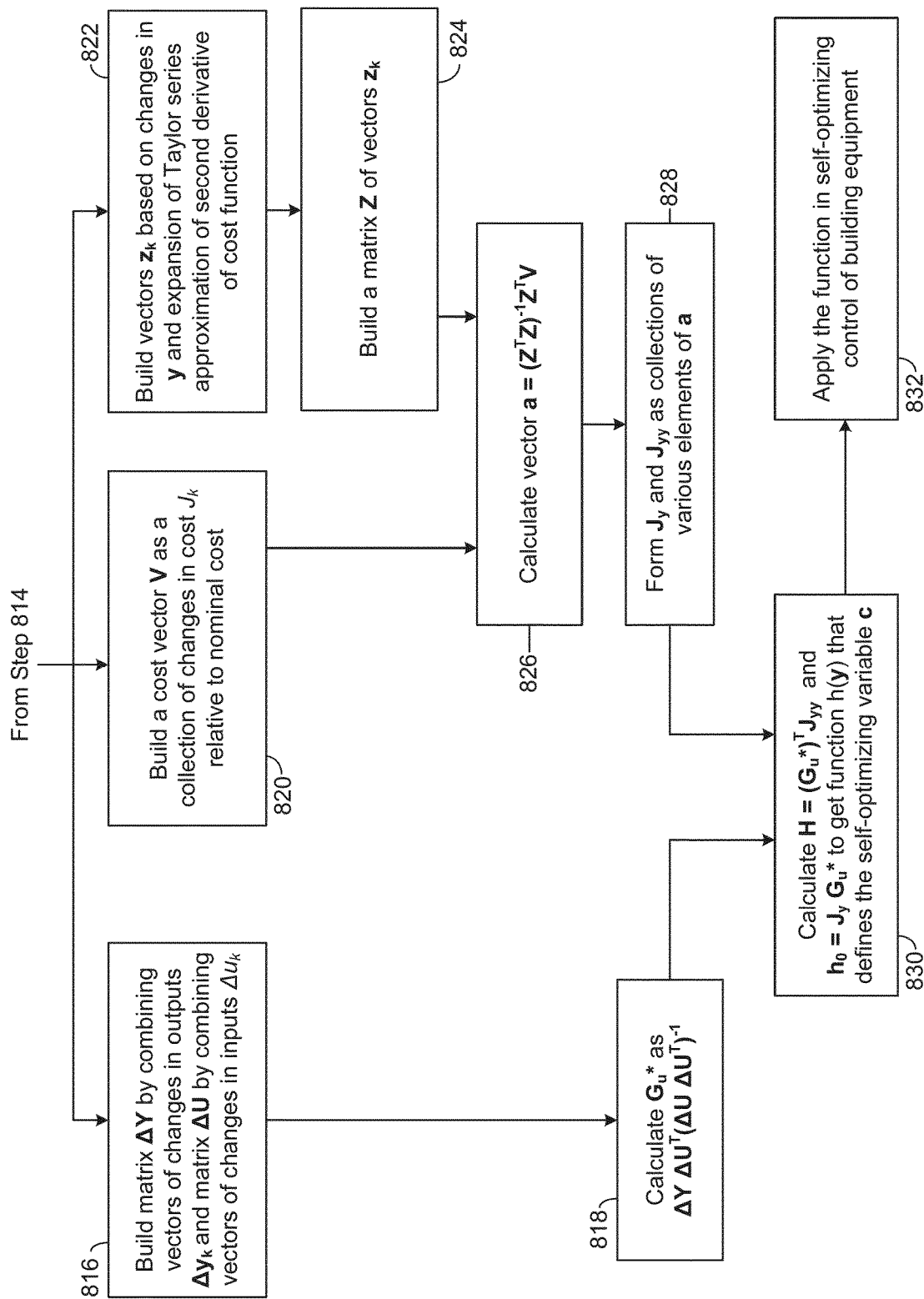
FIG. 9 is a flowchart of a second part of the process for identifying a self-optimizing control function, according to some embodiments.

Controlling c to zero will lead to the optimal operation of the plant 602. Systems and methods for generating non-optimal data and using the non-optimal data to calculate $h_0$ and H are shown in FIGS. 8-9 and described in detail with reference thereto.

Building System with Self-Optimizing Control

Figure 7:
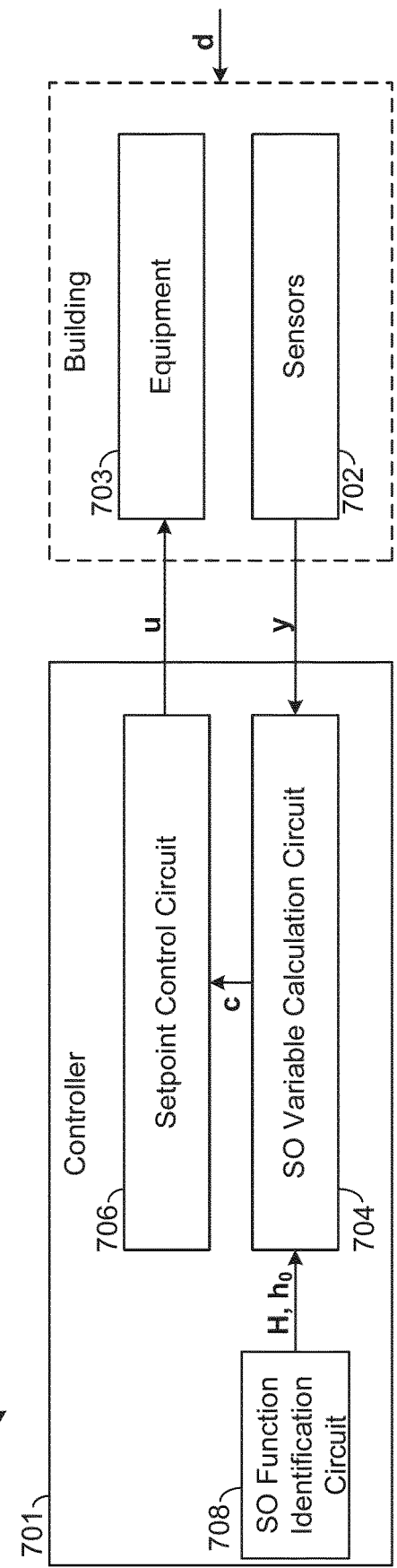
FIG. 7 is a block diagram of building system with self-optimizing control, according to some embodiments.

Referring now to FIG. 7, a block diagram of system 700 implementing the self-optimizing control structure of FIG. 6 is shown, according to some embodiments. System 700 includes a controller 701 communicably coupled to sensors 702 and equipment 703. The controller 701 comprises a self-optimizing (SO) variable calculation circuit 704, a setpoint control circuit 706, and a SO function identification circuit 708.

Equipment 703 is operable to affect a variable state or condition of a building (e.g., temperature, humidity, airflow, lighting, etc.) as controlled by an input u. Sensors 702 are configured to measure outputs y, for example environmental states or conditions of a building, and provide the measured outputs y to the SO variable calculation circuit 704.

The self-optimizing (SO) variable calculation circuit 704 is configured to use the measured outputs y to calculate c based on $c = h_0 + H\Delta y$ and provide the SO variable c to the setpoint control circuit 706. The SO variable calculation circuit 704 receives $h_0$ and H from the SO function identification circuit 708. The setpoint control circuit 706 is configured to control the SO variable c towards a setpoint $c_s$. That is, the setpoint control circuit 706 generates an input u for the equipment 703 to drive the SO variable c towards setpoint $c_s$. For example, the setpoint control circuit 706 may apply one or more proportional-integral (PI) control algorithms, proportional-integral-derivative (PID) control algorithms, etc. to drive the SO variable c towards setpoint $c_s$. In preferred embodiments, $c_s$ is set equal to zero.

In some embodiments, the SO function identification circuit 708 is pre-programmed with preset offset vector $h_0$ and matrix H, for example derived for use with a particular set of equipment or product in pre-market testing (e.g., laboratory testing, factory testing, computer simulation). In other embodiments, the SO function identification circuit 708 is configured to control the equipment 703 to generate non-optimal operating data and use the non-optimal operating data to calculate the offset vector $h_0$ and matrix H, for example as shown in FIGS. 8-9 and described in detail with reference thereto.

Self-Optimizing Function Identification from Non-Optimal Data

Referring now to FIG. 8-9, a process 800 for identifying a function for self-optimizing control from non-optimal operating data is shown, according to some embodiments. That is, process 800 results in a determination of the offset vector $h_0$ and matrix H, such that the self-optimizing variable can be calculated by $c = h_0 + H\Delta y$. Process 800 may be executed by system 700 of FIG. 7, including by the SO function identification circuit 708.

Process 800 calculates the offset vector $h_0$ and matrix H using the result of the following mathematical derivations. In order to calculate H explicitly from measured data, $\Delta J$ may be expressed as:

$$\Delta J = \begin{bmatrix} J_u^* \\ J_d^* \end{bmatrix}^T G_y^+ \Delta y + \frac{1}{2}\Delta y^T (G_y^+)^T \begin{bmatrix} J_{uu}^* & J_{ud}^* \\ J_{du}^* & J_{dd}^* \end{bmatrix} G_y^+ \Delta y.$$

Then, defining $$J_y = (G_y^+)^T \begin{bmatrix} J_u^* \\ J_d^* \end{bmatrix} \text{ and } J_{yy} = (G_y^+)^T \begin{bmatrix} J_{uu}^* & J_{ud}^* \\ J_{du}^* & J_{dd}^* \end{bmatrix} G_y^+,$$

$\Delta J$ may be simplified as $\Delta J = J_y^T \Delta y + \frac{1}{2}\Delta y^T J_{yy} \Delta y$.

Looking into $J_{yy}$, it may be seen that $$J_{yy} = (G_y^+)^T \begin{bmatrix} [J_{uu}^* \; J_{ud}^*]G_y^+ \\ [J_{du}^* \; J_{dd}^*]G_y^+ \end{bmatrix} = (G_y^+)^T \begin{bmatrix} H \\ [J_{du}^* \; J_{dd}^*]G_y^+ \end{bmatrix}.$$

Pre-multiplying by $G_y^T$, this leads to:

$$\begin{bmatrix} H \\ [J^*_{du} \ J^*_{dd}]G^+_y \end{bmatrix} = G^T_y J_{yy} = \begin{bmatrix} (G^*_u)^T \\ (G^*_d)^T \end{bmatrix} J_{yy} = \begin{bmatrix} (G^*_u)^T J_{yy} \\ (G^*_d)^T J_{yy} \end{bmatrix}.$$

Therefore, $H=(G_u^*)^T J_{yy}$. This is the expression used to calculate H.

The next step is to determine $h_0=J_u^*$. Pre-multiplying $$J_y = (G^+_y)^T \begin{bmatrix} J^*_u \\ J^*_d \end{bmatrix}$$

by $G_y^T$ and substituting this value with $G_y=[G_u^* G_{d^*}]$ leads to:

$$\begin{bmatrix} J^*_u \\ J^*_d \end{bmatrix} = (G_y)^T J_y = \begin{bmatrix} (G^*_u)^T \\ (G^*_d)^T \end{bmatrix} J_y = \begin{bmatrix} (G^*_u)^T J_y \\ (G^*_d)^T J_y \end{bmatrix}.$$

The upper element in the last term of the previous equation is equivalent to $J_u^*$, which is the equal to $h_0$. Therefore, $h_0=(G_u^*)^T J_y$. This is the expression used to calculate $h_0$.

Still referring to FIGS. 8-9, the process 800, described in detail below, includes generating non-optimal operating data using a series of step tests, calculating $G_u^*$, $J_y$, and $J_{yy}$ from the non-optimal operating data, and calculating $H=(G_u^*)^T J_{yy}$ and $h_0=(G_u^*)^T J_y$ to identify the function that defines the self-optimizing variable c.

At step 802, nominal inputs $u^*=[u_1^* \ldots u_i^* \ldots u_{n_u}^*]$ are set while keeping the disturbances constant at their nominal value $d^*$. Any nominal inputs $u^*$ may be selected as long as not at a constraint. At step 804, one of the inputs $u_i$ is changed from the nominal value $u_i^*$ to a value $u_{i,k}$ near $u_i^*$ to initiate a step test k. The other inputs $u_j$, $j \neq i$, are kept constant at their nominal values $u_j^*$.

At step 806, the equipment 703 is controlled using the input vector $u_k$ generated at step 804. The system may wait until the plant reaches a steady state. At step 808, the steady state outputs $y_{i,k}$ are measured (e.g., by sensors 702). The measured outputs $y_{i,k}$ are recorded in a vector $y=[y_1 \ y_2 \ldots y_i \ldots y_{n_y}]^T$. At step 810, the cost $J_k$ for the step test k is determined (e.g., read from a meter, calculated from $J(u,d)$). The change in the cost $J_k$ relative to the nominal cost (i.e., cost at nominal input $J(u^*, d^*)$) is then calculated and stored, i.e., $\Delta J_k=J_k-J(u^*,d^*)$.

At step 812, the differences in the inputs relative to the nominal inputs (i.e., $\Delta u_{j,k}=u_{j,k}-u_{j,k}^*$) are determined and stored in a vector $\Delta u_k=[\Delta u_{1,k} \ \Delta u_{2,k} \ldots \Delta u_{n_u,k}]^T$. At step 814, the difference in the outputs relative to the nominal outputs (i.e., $\Delta y_{i,k}=y_{i,k}-y_{i,k}^*$) are calculated and used to form the vector $\Delta y_k=[\Delta y_{1,k} \ \Delta y_{2,k} \ldots \Delta y_{n_y,k}]^T$.

Steps 802-814 are then repeated multiple times to provide multiple step tests k. For example, each input $u_i$ may be stepped through several values around the nominal point $u_i^*$ to provide several step tests k per input $u_i$. Any number of step tests may be conducted in various embodiments (e.g., K step tests). By repeating steps 802-814 multiple times (e.g., K times), non-optimal operating data is generated that may be used to calculate $H=(G_u^*)^T J_{yy}$ and $h_0=(G_u^*)^T J_y$ as shown in FIG. 9 and described below.

Referring now to FIG. 9, a second portion of process 800 is shown, according to some embodiments. At step 816, a matrix $\Delta Y=[\Delta y_1 \ \Delta y_2 \ldots \Delta y_K]$ is built by combining all of the vectors $\Delta y_k=[\Delta y_{1,k} \ \Delta y_{2,k} \ldots \Delta y_{n_y,k}]^T$ generated at step 814 during each step test k=1, ..., K. Also at step 816, a matrix $\Delta U=[\Delta u_1 \ \Delta u_2 \ldots \Delta u_K]$ is built by combining all of the vectors $\Delta u_k=[\Delta u_{1,k} \ \Delta u_{2,k} \ldots \Delta u_{n_u,k}]^T$ generated at step 812 during each step test k=1, ..., K.

It holds that $\Delta Y=G_u^* \Delta U$. Thus, after K step tests and gathering the measurements as in step 816, and solving for $G_u^*$, it is found that: $G_u^*=\Delta Y \Delta U^T (\Delta U \Delta U^T)^{-1}$. Accordingly, at step 818, $G_u^*$ is calculated from the non-optimal data stored in $\Delta Y$ and $\Delta U$ as $G_u^*=\Delta Y \Delta U^T (\Delta U \Delta U^T)^{-1}$.

At step 820, a cost vector $V=[\Delta J_1 \ \Delta J_2 \ldots \Delta J_K]^T$ is formed as a collection of the changes in cost $J_k$ relative to nominal cost calculated at step 810.

At step 822, vectors $z_k$ are built based on changes in y and expansion of a Taylor series approximation of the second derivative of the cost function J. More particularly, given $\Delta y$ formed as above from the differences, $\Delta y_i=y_i-y_i^*$ (i.e., $\Delta y=[\Delta y_1 \ \Delta y_2 \ldots \Delta y_{n_y}]^T$), the equation $\Delta J=J_y^T \Delta y + \frac{1}{2} J_{yy} \Delta y$ can be expanded to express $\Delta J$ as a sum of the individual $\Delta y_i$ as $$\Delta J = a_1 \Delta y_1 + a_2 \Delta y_2 + \ldots + a_{n_y} \Delta y_{n_y} + a_{n_y+1} \Delta y_1^2 +$$
$$a_{n_y+2} \Delta y_1 \Delta y_2 + \ldots \ldots + a_{\frac{n_y^2+3n_y}{2}-1} \Delta y_{n_y-1} \Delta y_{n_y} + a_{\frac{n_y^2+3n_y}{2}} \Delta y_{n_y}^2$$

This means that the matrices $\Delta J_y$ and $\Delta J_{yy}$ can be represented in terms of the coefficients $\alpha_i$ as:

$$J_y = \begin{bmatrix} a_1 & a_2 & \ldots & a_{n_y} \end{bmatrix}^T;$$

$$J_{yy} = \begin{bmatrix} 2a_{n_y+1} & a_{n_y+2} & \ldots & a_{2n_y} \\ a_{n_y+2} & 2a_{2n_y+1} & \ldots & a_{3n_y-1} \\ \vdots & \vdots & \ddots & \vdots \\ a_{2n_y} & a_{3n_y-1} & \ldots & 2a_{\frac{n_y^2+3n_y}{2}} \end{bmatrix}.$$

Then, $\Delta J$ may be simplified as $\Delta J=z^T a$, where:

$$z = \begin{bmatrix} \Delta y_1 & \Delta y_2 & \ldots & \Delta y_n & \Delta y_1^2 & \Delta y_1 \Delta y_2 & \ldots & \Delta y_{n_y-1} \Delta y_{n_y} & \Delta y_{n_y}^2 \end{bmatrix}^T \text{ and}$$

$$a = \begin{bmatrix} a_1 & a_2 & \ldots & a_{\frac{n_y^2+3n_y}{2}} \end{bmatrix}^T.$$

Thus, at step 822, K vectors $z_k$ are built from the measurements from step 808 as $z_k=[\Delta y_{1,k} \ \Delta y_{2,k} \ldots \Delta y_{n,k} \ \Delta y_{1,k}^2 \ \Delta y_{1,k} \Delta y_{2,k} \ldots \Delta y_{n_y-1,k} \Delta y_{n_y,k} \ \Delta y_{n_y,k}^2]^T$. At step 824, these vectors $z_k$ are collected to build a matrix $Z=[Z_1 \ldots z_k \ldots z_K]^T$.

With K step tests, the following data set is generated:

$$\begin{bmatrix} \Delta J_1 \\ \Delta J_2 \\ \vdots \\ \Delta J_M \end{bmatrix} = \begin{bmatrix} z_1^T \\ z_2^T \\ \vdots \\ z_M^T \end{bmatrix} a.$$

Applying the definitions of Z and V above, this equation can be solved for the vector a to yield $a=(Z^T Z)^{-1} Z^T V$. Thus, at step 826, the vector a may be calculated as $a=(Z^T Z)^{-1} Z^T v$.

At step 828, the matrices $J_y$ and $J_{yy}$ can be formed using various elements of a. More particularly, using equations stated above, $J_y$ and $J_{yy}$ can be determined as $$J_y = [a_1 \quad a_2 \quad \cdots \quad a_{n_y}]^T;$$

$$J_{yy} = \begin{bmatrix} 2a_{n_y+1} & a_{n_y+2} & \cdots & a_{2n_y} \\ a_{n_y+2} & 2a_{2n_y+1} & \cdots & a_{3n_y-1} \\ \vdots & \vdots & \ddots & \vdots \\ a_{2n_y} & a_{3n_y-1} & \cdots & 2a_{\frac{n_y^2+3n_y}{2}} \end{bmatrix}.$$

It should be noted that the number of step tests K should be greater than, or equal to, $$\frac{n_y^2 + 3n_y}{2}$$

in order to have a full column rank matrix Z, so that $Z^T Z$ be invertible.

From steps 818 and 828, $G_u^*$, $J_y$, and $J_{yy}$ have been calculated from non-optimal operating data generated using the step-test approach of process 800. Thus, at step 830, H can be calculated as $H=(G_u^*)^T J_{yy}$ and $h_0$ can be calculated as $h_0=(G_u^*)^T J_y$. H and $h_0$ can then be combined to form the self-optimizing control function $c=h(y)=h_0+Hy$. At step 832, this function is applied in self-optimizing control of building equipment, for example as described with reference to FIGS. 6-7 above.

VAV System with Various Control Structures: Examples and Experimental Results

Figure 10:
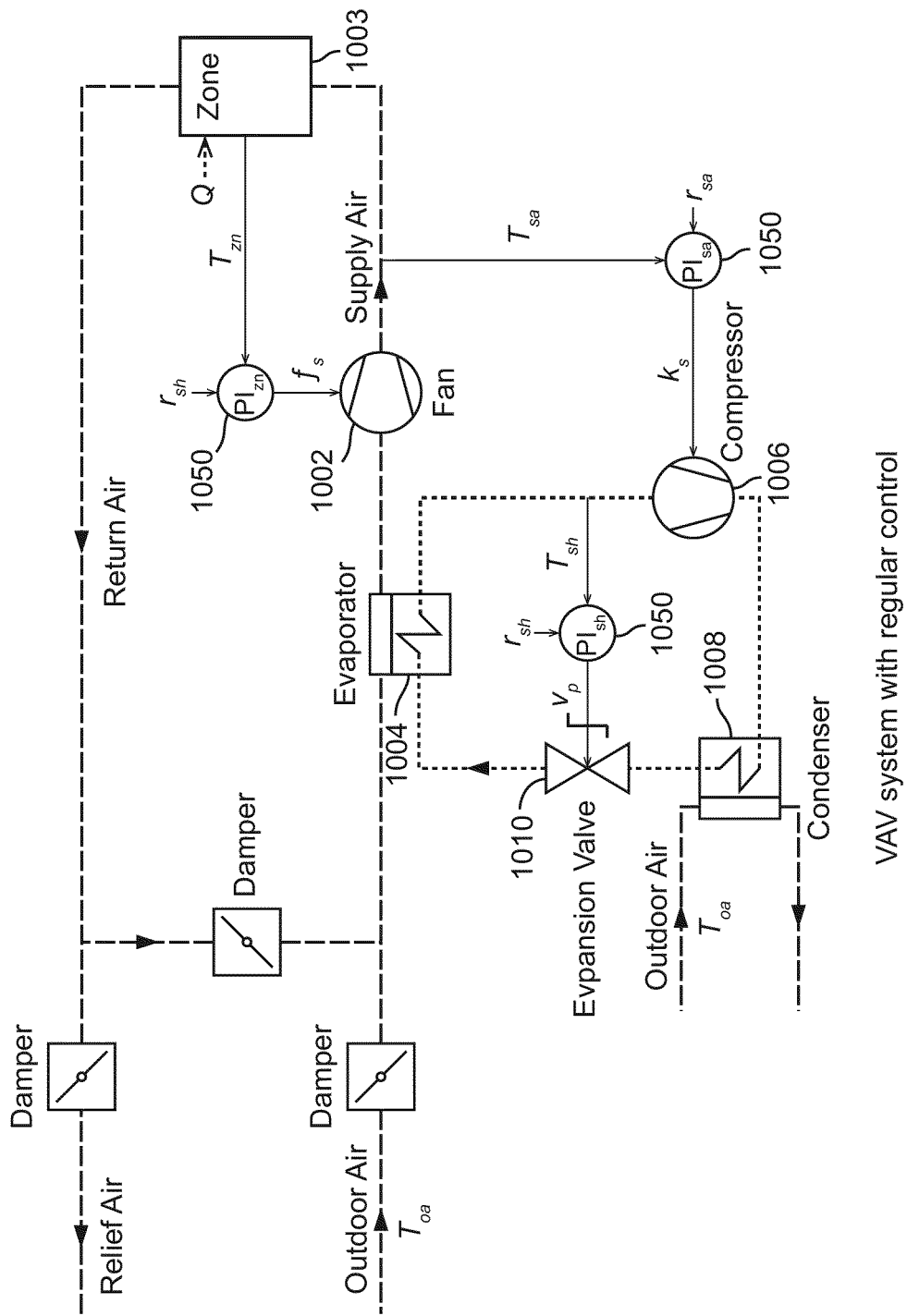
FIG. 10 is a block diagram of a variable air volume (VAV) system under conventional control, according to some embodiments.
Figure 11:
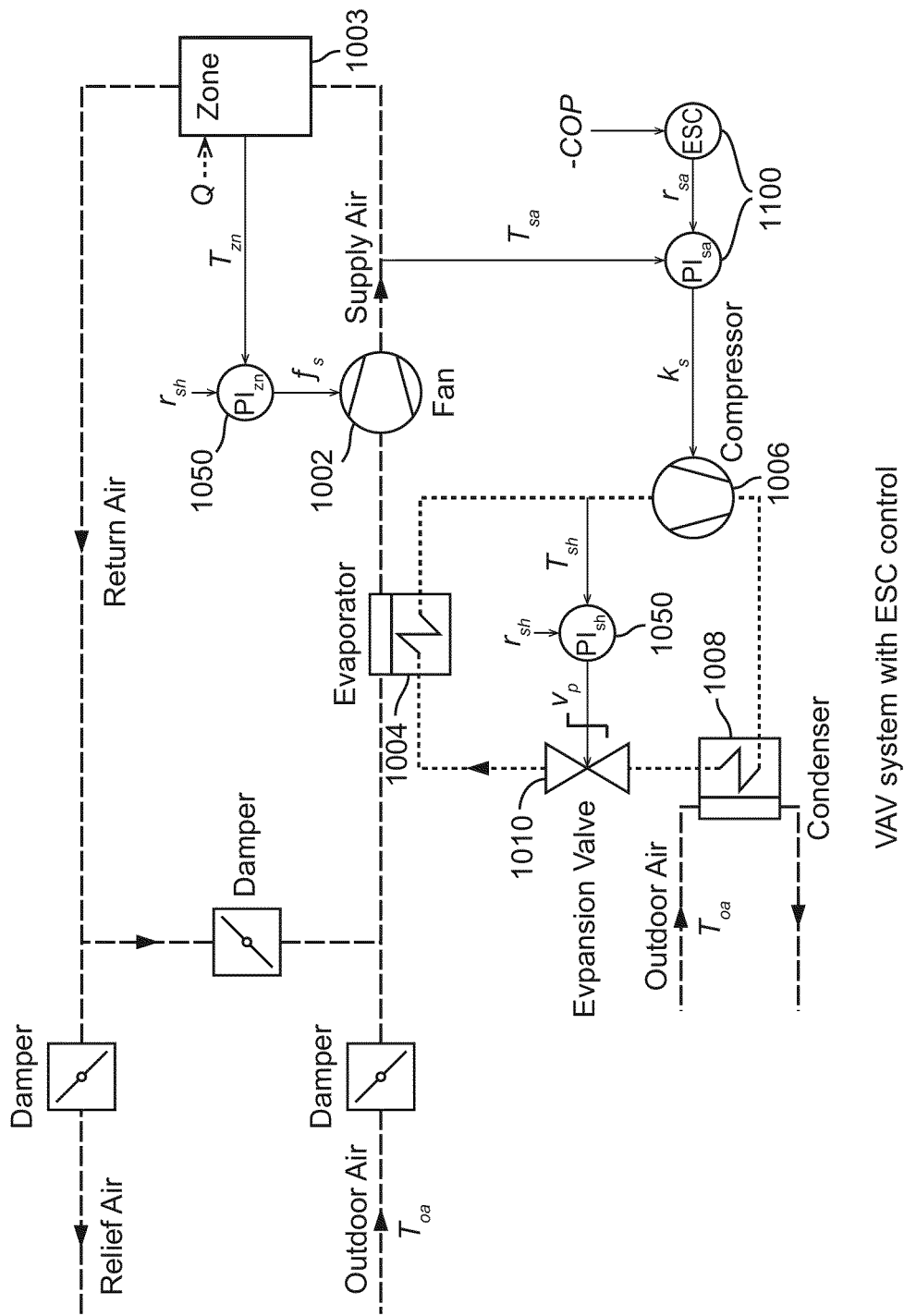
FIG. 11 is a block diagram of a VAV system under extremum seeking control, according to some embodiments.
Figure 12:
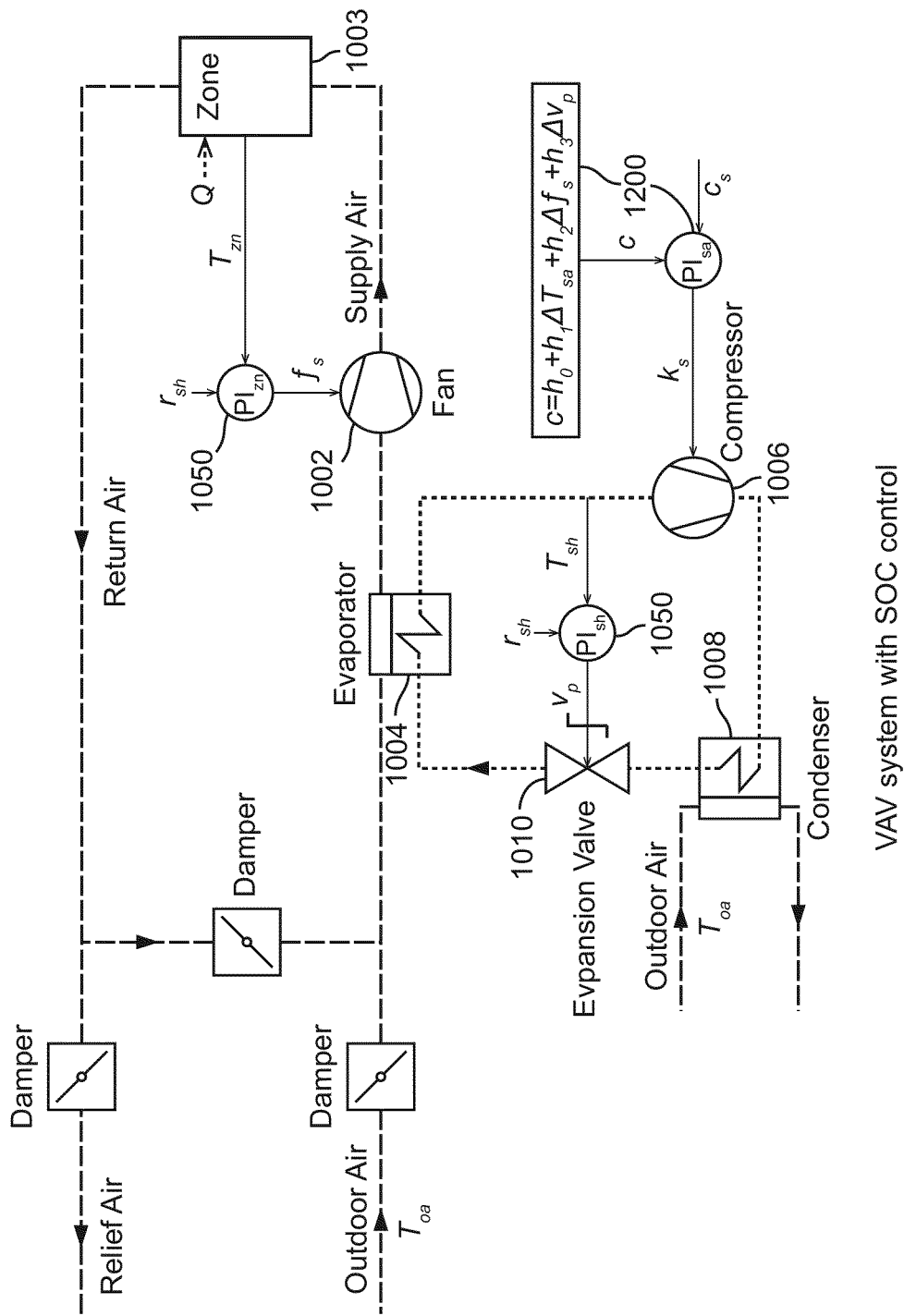
FIG. 12 is a block diagram of a VAV system under self-optimizing control, according to some embodiments.

Referring now to FIGS. 10-18, variable air volume (VAV) systems under various control structures and simulated experimental results generating using the various control structures are shown to illustrate the performance of the SOC for the non-optimal operating data approach described herein. FIG. 10 shows a VAV system under regular setpoint control, FIG. 11 shows a VAV system under extremum-seeking control (ESC), and FIG. 12 shows a VAV system under SOC, according to exemplary embodiments. FIGS. 13-19 show graphical representations of experimental results to illustrate the relative performance of the SOC approach described herein.

The VAV system 1000 shown in FIGS. 10-12 includes a fan 1002 configured to pull return air and/or outdoor air across an evaporator 1004 to provide supply air to a building zone 1003. The fan 1002 operates at a fan speed $f_s$. The fan speed $f_s$ may be controllable. The evaporator 1004 is coupled to a compressor 1006, a condenser 1008, and an expansion valve 1010. The compressor 1006 operates at a controllable compressor speed $k_s$ and compresses a refrigerant. The refrigerant flows through the condenser 1008, where the refrigerant condenses as it transfers heat to outdoor air at the outdoor air temperature $T_{oa}$. The refrigerant then passes through the expansion valve 1010, which has a controllable valve position $v_p$, causing expansion and cooling of the refrigerant. The refrigerant then passes through the evaporator 1004, where the refrigerant removes heat from the return air and/or outdoor air pulled by the fan 1002. This results in supply air of supply air temperature $T_{sa}$ being supplied to the building zone 1003 by the fan 1002 at a rate determined by the fan speed $f_s$.

In the examples and experimental results included below, the optimization goal for the VAV system is to minimize energy consumption while still satisfying load requirements. Here, the optimization objective is defined as maximization of the coefficient of performance (COP) of the system. The COP is defined as the ratio of the heat removed in the evaporator divided by the combined amount of power exerted by the compressor and fan, $$COP = \frac{Q_{evap}}{W_k + W_f}.$$

It should be noted that the fan power associated with the condenser could also be included in the COP calculation but is not included in the present study.

The COP can be increased by increasing the amount of heat removed in the evaporator 1004 while the power used by the compressor 1006 and fan 1002 is kept constant, reduced, or allowed to increase but not as much as the removed heat. These changes are achieved by changing the setpoints to the superheat temperature $r_{sh}$, supply air temperature $r_{sa}$ and zone temperature $r_{zn}$, respectively. Due to comfort constraints, the value of $r_{zn}$ cannot be changed to achieve the optimization goal. The superheat setpoint $r_{sh}$ could be adjusted, as long as it is kept positive; furthermore, lower superheat values lead to a better performance. Thus it makes sense to keep $r_{sh}$ constant at a small value. Therefore, the only option is to manipulate $r_{sa}$ to decrease the power used by the compressor. By increasing the supply air temperature the compressor speed is reduced, thereby reducing compressor power; however, the fan speed is increased, thereby increasing fan power. Optimization therefore requires finding the optimum trade-off between compressor power and fan power.

Each of FIGS. 10-12 shows the VAV system 1000 with a different control system. In FIG. 10, the VAV system 1000 is controlled by a regular control system 1050. The regular control system 1050 is configured to attempt to keep the temperature in the zone $T_{zn}$ at a desired value $r_{zn}$, regardless of the outdoor temperature and load conditions. In order to achieve the zone temperature setpoint, a fan speed $f_x$ is manipulated by the regular control system 1050. The fan blows supply air at a temperature $T_{sa}$ that it is controlled by manipulating a compressor speed $k_s$. The expansion valve $v_p$ is controlled to maintain the superheat temperature $T_{sh}$ at a setpoint value $r_{sh}$. In the example used herein, the regular control system 1050 controls to a constant temperature setpoint $r_{zn}$, without any adjustments or other control to minimize costs. In other cases, a RTO layer (e.g., a model predictive controller) may be included to alter the setpoint value $r_{sh}$ to attempt to minimize costs or perform some other optimization.

In FIG. 11, an extremum-seeking control (ESC) system 1100 is included to control the VAV system 1000. The ESC system 1100 is configured to minimize a cost. Accordingly, in this example, the value of $r_{sa}$ is found as a function of the negative COP. This relationship can be expressed as $r_{sa}=ESC(-COP)$, where $ESC(\bullet)$ is the control sequence that finds the optimal value $r_{sa}^{opt}$ that drives the COP to its optimal value $COP^{opt}$. The variable manipulated to achieve the setpoint $r_{sa}$ is the compressor speed $k_s$, and is calculated by feedback control $k_s=PI_{sa}(\tilde{T}_{sa})$ where $\tilde{T}_{sa}=r_{sa}-T_{sa}$ is the setpoint error of the supply air temperature. $PI_{sa}(\bullet)$ is a function that represents any discrete or continuous PI controller that drives the supply air temperature to its setpoint.

In FIG. 12, a self-optimizing control system 1200 (e.g., controller 700) is included to control the VAV system 1000. For this example, the variables selected to calculate the SO variable are the supply air temperature $T_{sa}$, the fan speed $f_s$ and valve position $v_p$. The SO variable is $$c = h_0 + h_1 \Delta T_{sa} + h_2 \Delta f_s + h_3 \Delta v_p$$
$$= h_0 + H\Delta y.$$

with $H=[h_1\ h_2\ h_3]$, $\Delta y=[\Delta T_{sa}\ \Delta f_s\ \Delta v_p]T$, and $\Delta T_{sa}=T_{sa}-T_{sa}^*$, $\Delta f_s=f_s-f_s^*$, and $\Delta v_p=v_p-v_p^*$. The variables $T_{sa}^*$, $f_s^*$ and $v_p^*$ are the nominal conditions for the supply air temperature, fan speed and valve position, respectively. For SOC with an optimal reference (referred to in the following as "SOC"), used for the sake of comparison in the experimental results discussed below, $h_0=0$, $T_{sa}^*=T_{sa}^{opt}$, $f_s^*=f_s^{opt}$, $v_p^*=v_p^{opt}$ are used. For SOC with a non-optimal reference point (referred to in the following as "SOC-NOR"), $T_{sa}^*=T_{sa}^r$, $f_s^*=f_s^r$, $v_p^*=v_p^r$ are used.

The self-optimizing control system 1200 controls the SO variable c to zero by manipulating the compressor speed $k_s$, which is calculated with a PI controller as $k_s=PI_c(c)$. $PI_c(\cdot)$ is a function that represents any discrete or continuous PI controller that drives the SO variable to its setpoint (e.g., to zero).

For the sake of generating the simulation data described herein, numerical values for $h_0$ and H were calculated using the process 800 shown in FIGS. 8-9. For this example, the step tests are based on the nominal conditions of the outdoor air temperature and zone load, which are $T_{oa}^*=27°$ C. and $Q^*=2900$ W. The setpoints for the zone temperature and superheat temperature are $r_{zn}=24°$ C. and $r_{sh}=6°$ C.

The nominal optimal operating conditions (used to calculate H for SOC) for these disturbance values are obtained with ESC: the optimal value for the compressor speed is $k_s^{opt}=0.4955$, supply air temperature is $T_{sa}^{opt}=10.1674°$ C., fan speed is $f_s^{opt}=0.5457$ and valve position is $v_p^{opt}=0.1233$.

The normal non-optimal reference values used in this example are given by compressor speed $k_s^r=0.4805$, supply air temperature $T_{sa}^r=12°$ C., fan speed $f_s^r=0.6022$ and valve position $v_p^r=0.1279$.

The sequence of input and disturbances are generated as $Q_i=Q^*+\Delta Q_i$, $T_{oa,j}=T_{oa}^*+\Delta T_{oa,j}$ and $k_{s,k}=k_s^*+\Delta k_{s,k}$ where $k_s^*=k_s^{opt}$ for SOC, and $k_s^*=k_s^r$ for SOC-NOR. Furthermore, $$\Delta Q_i=-120+20i, i\in[1,2,\ldots,n_Q]$$

$$\Delta T_{oa,j}=-6+j, j\in[1,2,\ldots,n_T]$$

$$\Delta k_{s,k}=-0.43+0.08k, k\in[1,2,\ldots,n_k]$$

with $n_Q=11$, $n_T=16$ and $n_k=11$ being the number of values for the zone load, outdoor air temperature and compressor speed, respectively. This gives 1936 simulations with all the possible combinations of $Q_i$, $T_{oa,j}$ and $k_{s,k}$. After performing the step tests, the calculated value of H for SOC is H=[0.3969017 −124.6954 216.0882], while the calculated value for SOC-NOR are:

$$h_0=-3.8704;$$

$$H=[0.2496113\ -74.37981\ 142.5401].$$

Referring now to FIGS. 13-18, graphical representations of simulated experimental results generated using the four control structures described with reference to FIGS. 10-12 are shown (i.e., normal control, ESC, SOC, and SOC-NOR).

In this simulation, the outdoor air temperature is changed from its nominal value in order to evaluate the performance of the control structures. The number of $T_{oa}$ values used is 14 and are selected as $T_{oa,i}=T_{oa}^*+\Delta T_{oa,i}$, where $\Delta T_{oa,i}=-4+l$, $l\in[1, 2, \ldots, 14]$. The rest of the nominal operating conditions do not change. The simulations run for 70000 seconds. The system is initially driven to its nominal optimal conditions, and changes in the outdoor air temperature are introduced at the 50000 second mark.

Figure 13:
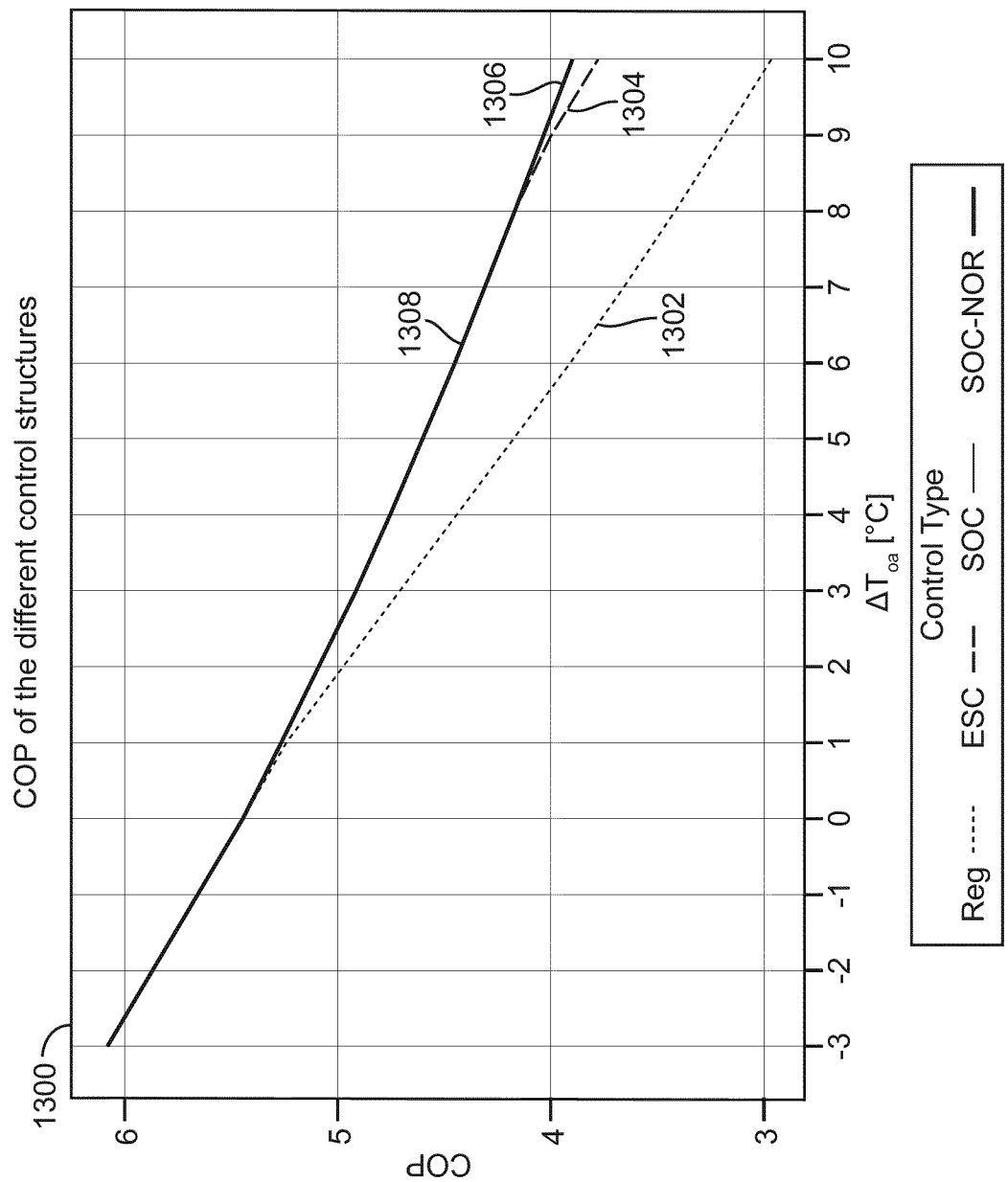
FIG. 13 is a first graphical representation of coefficients of performance for VAV systems under various types of control, according to some embodiments.

FIG. 13 includes a graph 1300 showing how the COP changes when the outdoor air temperature changes. Each control structure is depicted: line 1302 charts regular control, line 1304 charts ESC, line 1306 charts SOC, and line 1308 charts SOC-NOR. As expected, the COP decreases from its nominal value when the $\Delta T_{oa}>0$, and increases when $\Delta T_{oa}<0$. The COP results for ESC, SOC and SOC-NOR (i.e., line 1304, line 1306, and line 1308) are essentially identical for most of the temperature range, whereas the COP obtained with regular control is lower than that of ESC, SOC, and SOC-NOR when $\Delta T_{oa}$ increases. Since the ESC results correspond to the optimal operation, it can be concluded that SOC and SOC-NOR kept the VAV system 1000 at its optimal operation for the simulated disturbance conditions. However, SOC-NOR used normal non-optimal operation data to identify its parameters, while SOC needed optimal data for the same purpose.

An interesting result is that COP values obtained with ESC, SOC and SOC-NOR start diverging when $\Delta T_{oa}>8°$ C. Exploration of this divergence is contemplated by this report but not developed in the present disclosure. Instead, FIGS. 14-18 present graphical representations of system behavior at the two extremes where the ESC, SOC, and SOC-NOR results agree, namely $\Delta T_{oa}=-3°$ C. and $\Delta T_{oa}=8°$ C.

Figure 14:
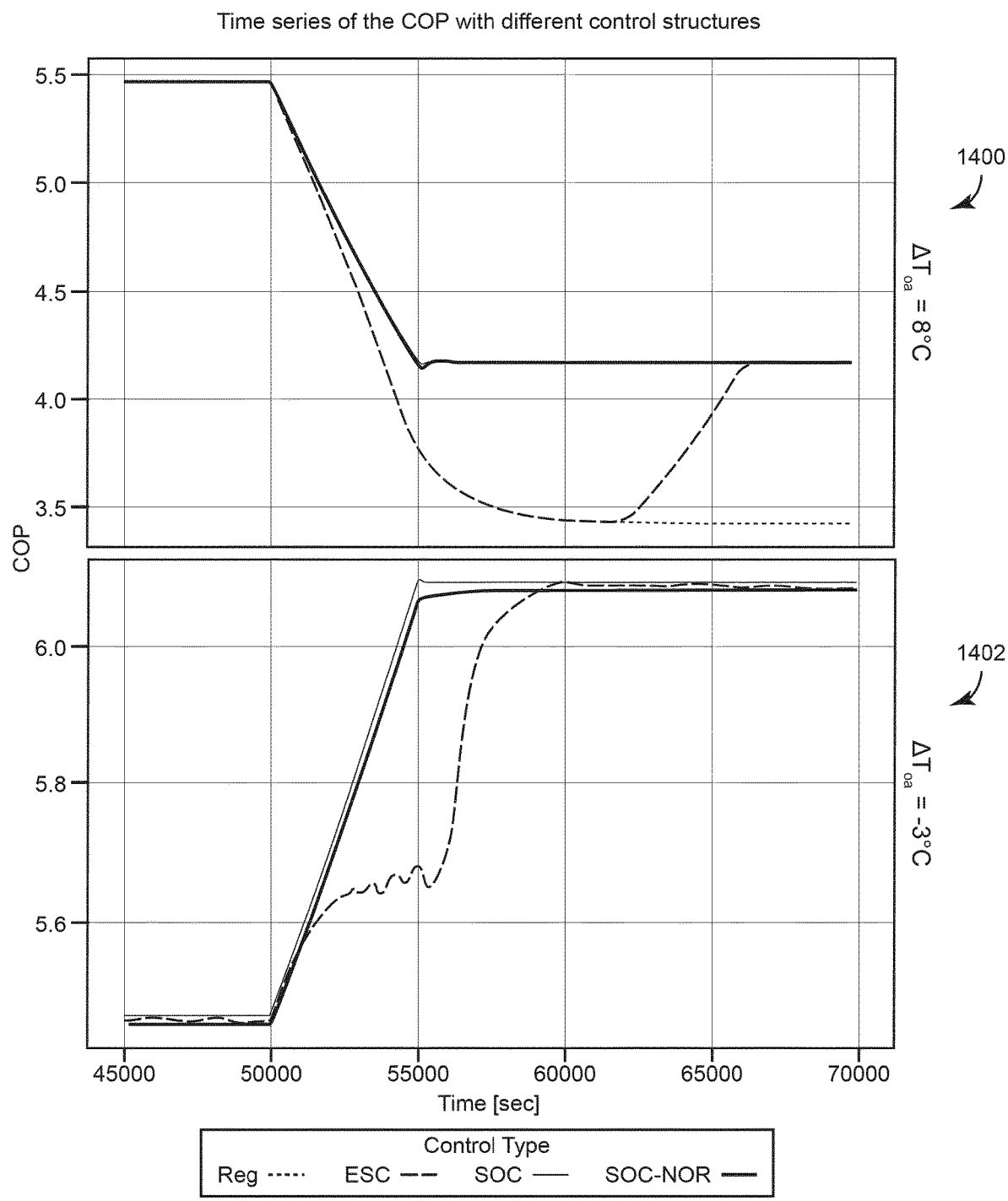
FIG. 14 is a second graphical representation of coefficients of performance for VAV systems under various types of control, according to some embodiments.
Figure 15:
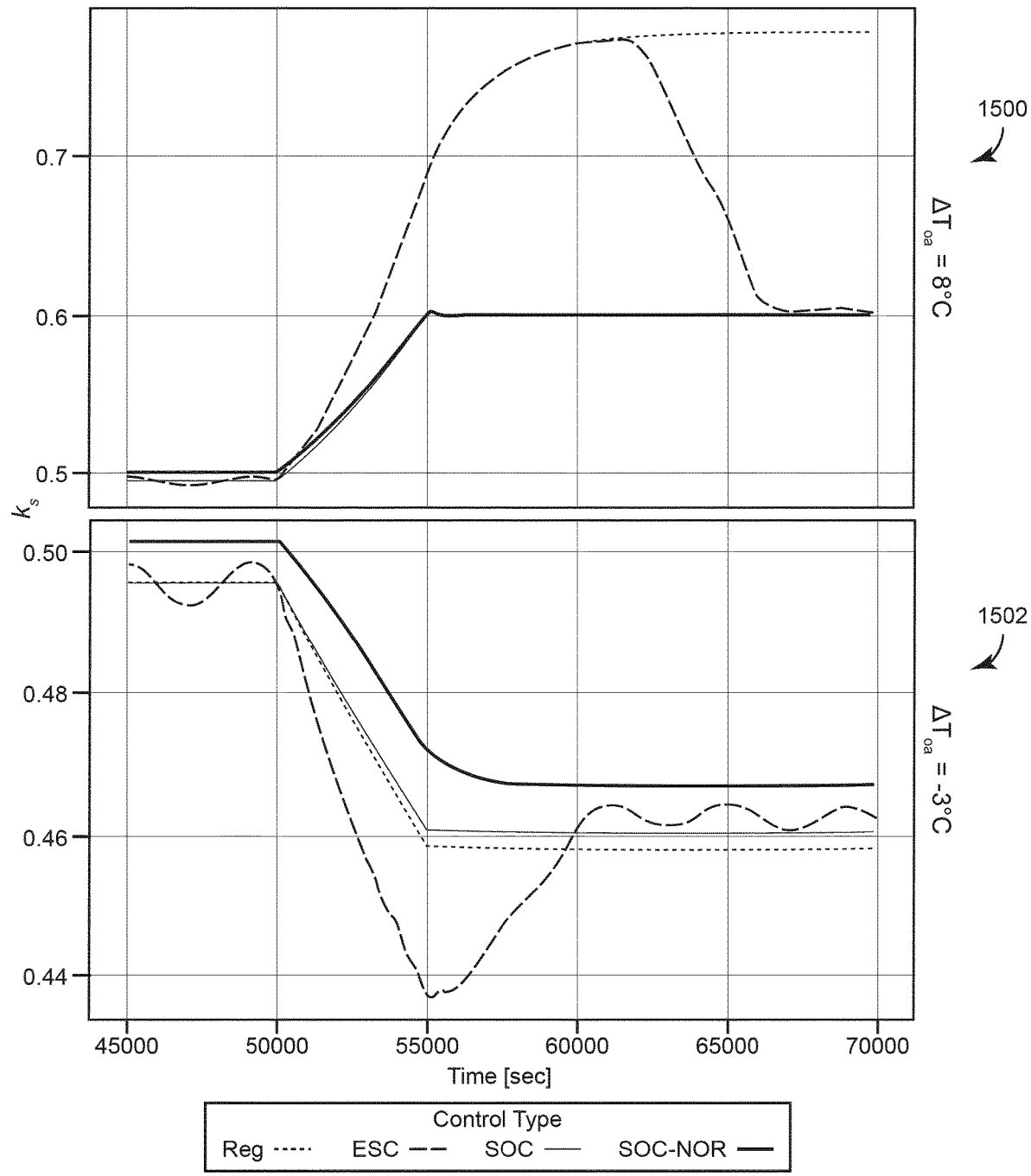
FIG. 15 is a graphical representation of compressor speeds for VAV systems under various types of control, according to some embodiments.
Figure 16:
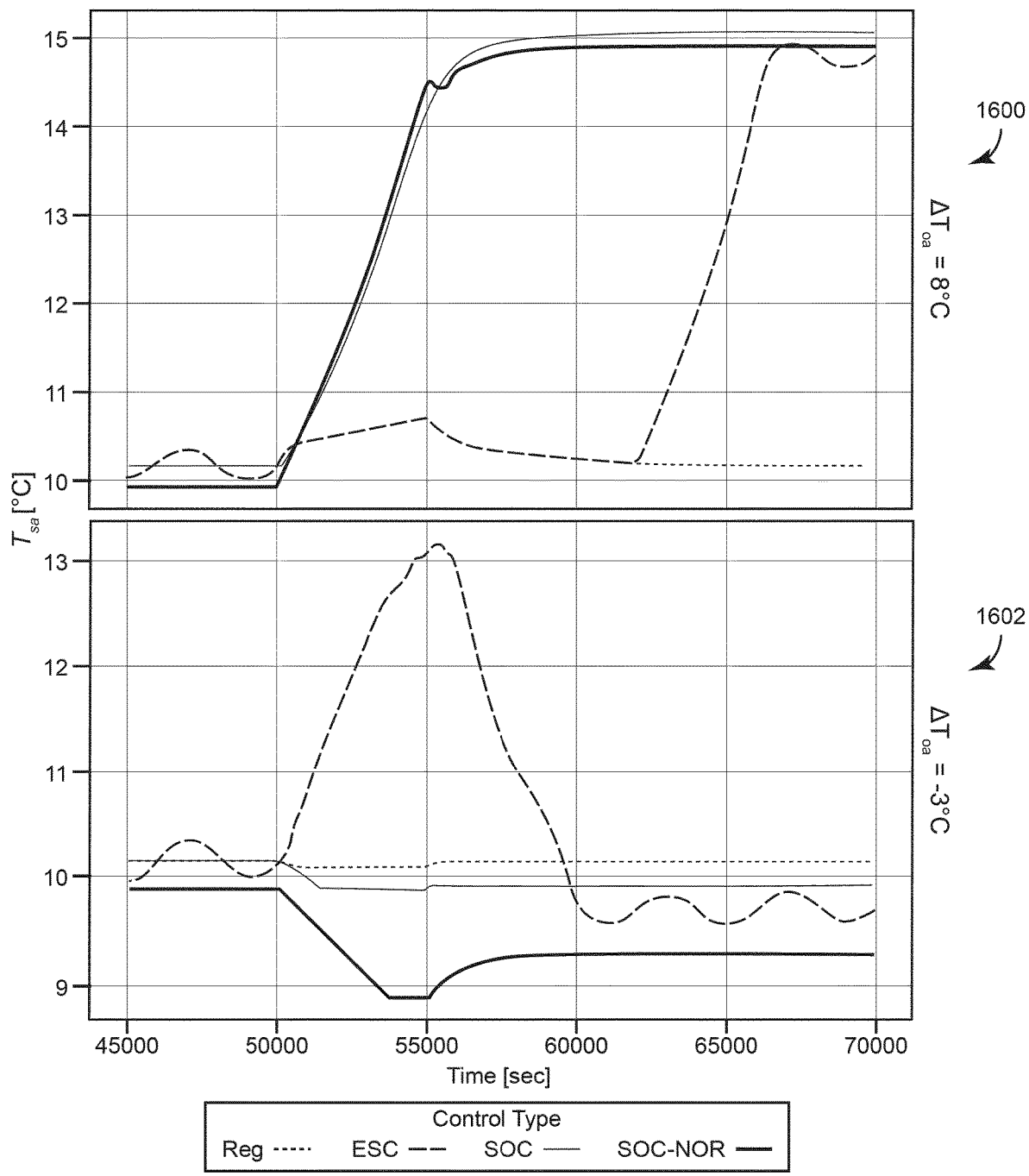
FIG. 16 is a graphical representation of supply air temperatures for VAV systems under various types of control, according to some embodiments.
Figure 17:
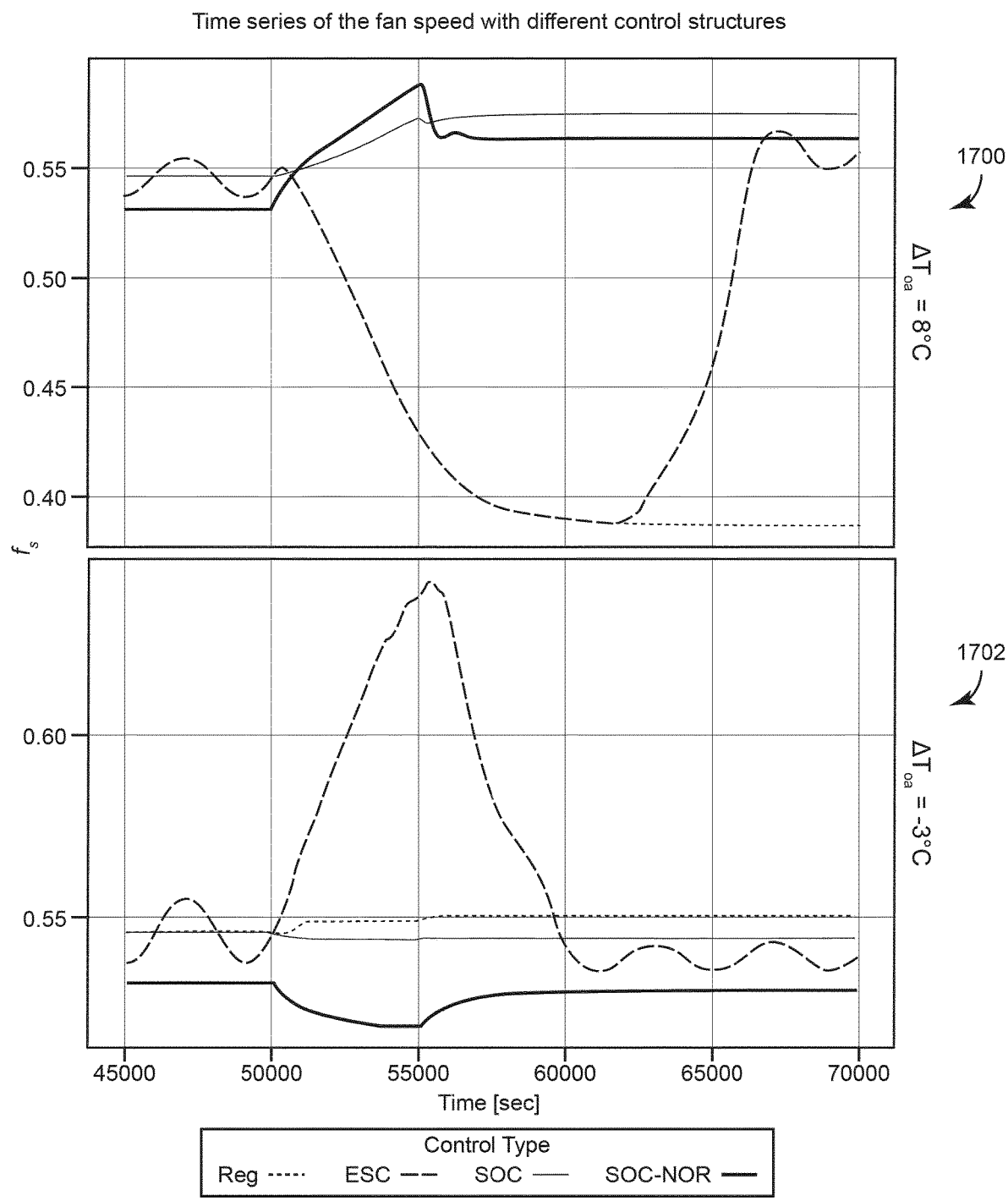
FIG. 17 is a graphical representation of fan speeds for VAV systems under various types of control, according to some embodiments.
Figure 18:
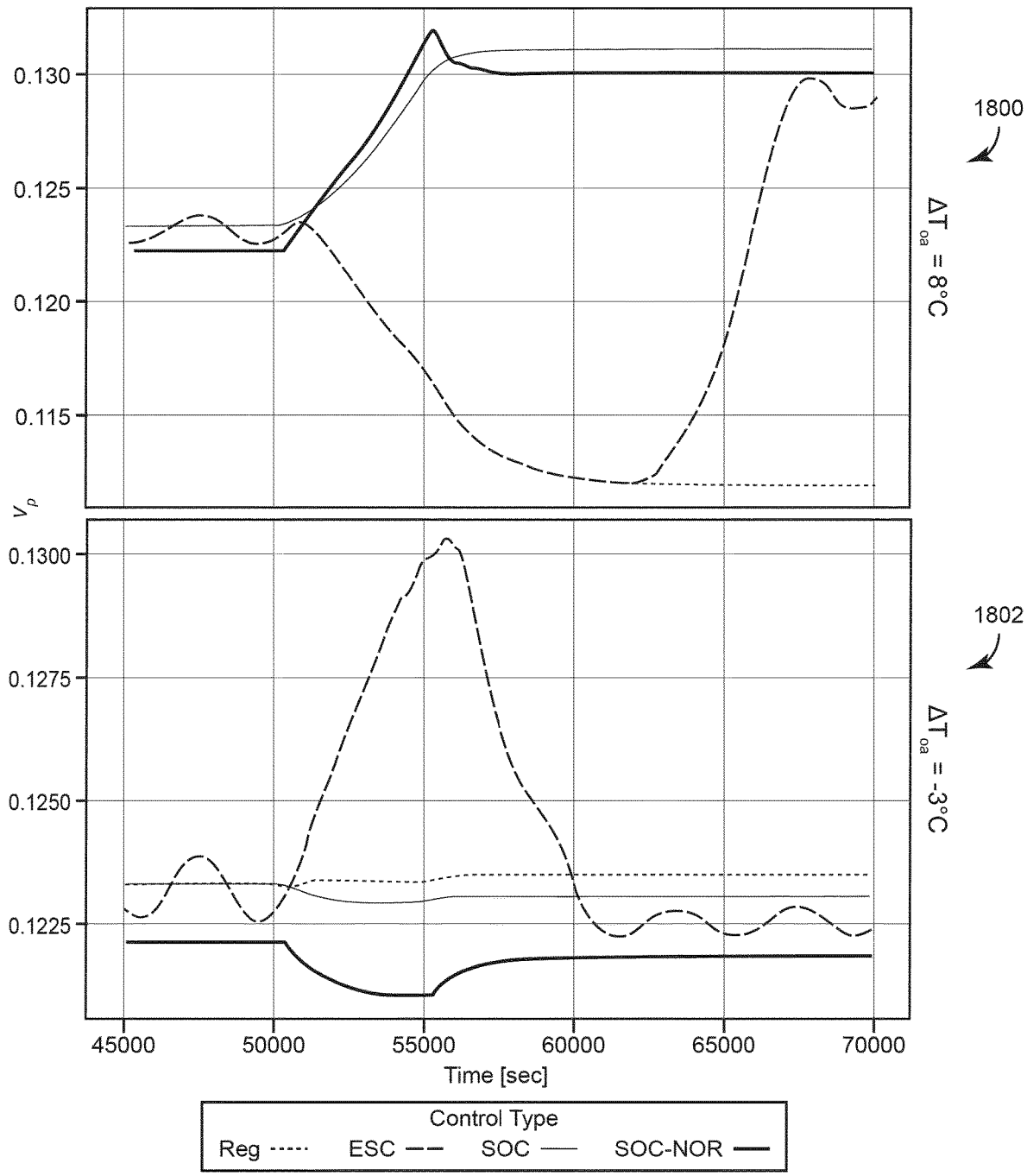
FIG. 18 is a graphical representation of valve positions for VAV systems under various types of control, according to some embodiments.

FIG. 14 shows a graph 1400 of COP over time at $\Delta T_{oa}=8°$ C. and a graph 1402 of COP over time at $\Delta T_{oa}=-3°$ C. for the four control types. FIG. 15 shows a graph 1500 of compressor speed over time at $\Delta T_{oa}=8°$ C. and a graph 1502 of compressor speed over time at $\Delta T_{oa}=-3°$ C. for the four control types. FIG. 16 shows a graph 1600 of supply air temperature over time at $\Delta T_{oa}=8°$ C. and a graph 1602 of supply air temperature over time at $\Delta T_{oa}=-3°$ C. for the four control types. FIG. 17 shows a graph 1700 of fan speed over time at $\Delta T_{oa}=8°$ C. and a graph 1702 of fan speed over time at $\Delta T_{oa}=-3°$ C. for the four control types. FIG. 18 shows a graph 1800 of expansion valve position over time at $\Delta T_{oa}=8°$ C. and a graph 1802 of expansion valve position over time at $\Delta T_{oa}=-3°$ C. for the four control types. When $\Delta T_{oa}=8°$ C., the SOC and SOC-NOR reach final values in a relatively short amount of time compared to when ESC does. This is due to ESC initially moving in the direction of the regular controller and later changing its course in the direction of the SOC and SOC-NOR paths. For the case of $\Delta T_{oa}=-3°$ C., the variables move in the same direction for the three control structures.

The systems and methods for self-optimizing control based on non-optimal operating data presented herein perform consistently with the SOC approach based on optimal data, without the need to obtain optimal data. The system and methods described herein therefore represent a significant improvement over existing approaches.

Figure 19:
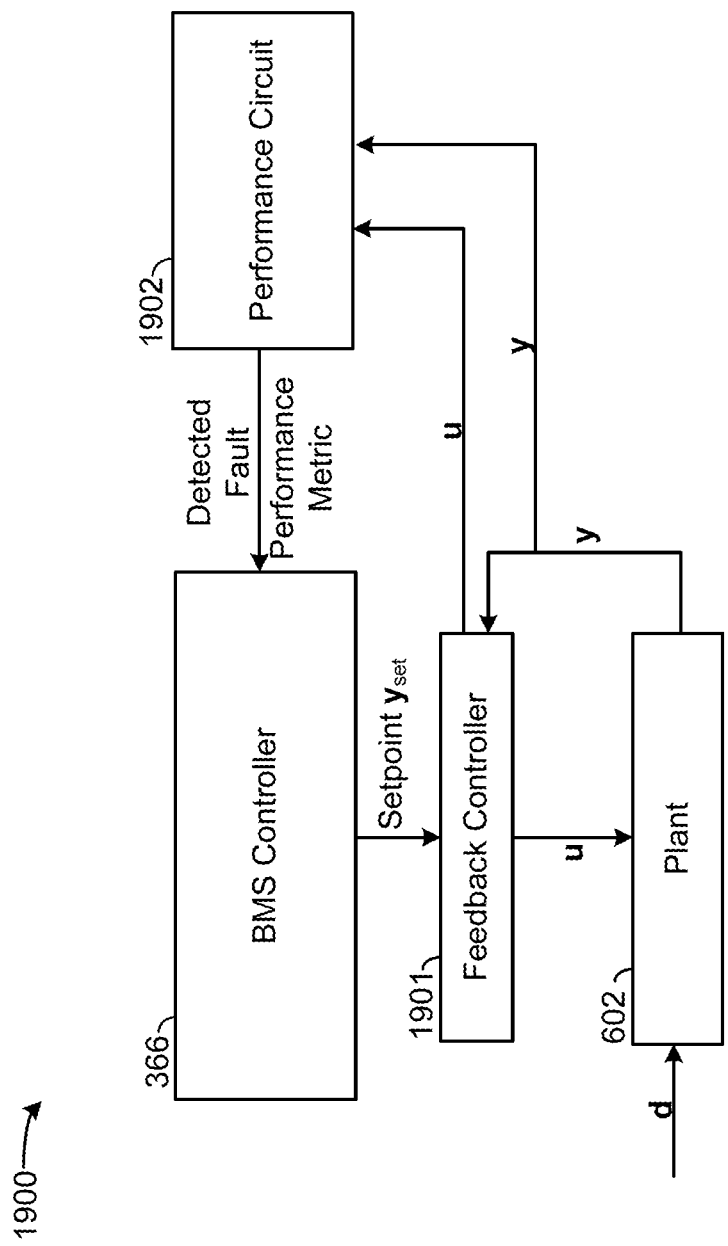
FIG. 19 is a block diagram of a building management system using self-optimizing control principles for fault detection and analytics, according to some embodiments.

Fault Detection and Performance Analysis Using Self-Optimizing Control Functions Referring now to FIG. 19, a building management system (BMS) 1900 is shown, according to some embodiments. In various embodiments, the BMS 1900 includes the same or similar features as BMS 300, BMS 400, or BMS 500. For example, as shown in FIG. 19, the BMS 1900 includes the BMS controller 366 (which is described in further detail above with reference to FIGS. 3-4), a feedback controller 1901 (which may correspond to AHU controller 330 or another controller), and plant 602 (which can include any of the various building equipment as described above which is operable to affect a variable state or condition of one or more buildings). The BMS 1900 is also shown to include a performance circuit 1902. In the example shown, the performance circuit 1902 is physically separated from the BMS controller 366 and the feedback controller 1901, for example implemented at a remote cloud computing resource. In other embodiments, the performance circuit 1902 is included in the BMS controller 366, for example to be operated locally (i.e., at or proximate the plant 602). The following description of FIGS. 19-21 use notation consistent with definitions provided above.

As illustrated by FIG. 19, the feedback controller receives measurements of a measured output y, which is indicative of a measured state of the plant 602. The feedback controller 1901 also receives a setpoint $y_{set}$ (e.g., from the BMS controller 366, from a user, or any other data source) that defines a target value for the measured output y. The feedback controller 1901 is configured to generate an input u that controls the plant 602 (i.e., building equipment) to drive the measured output y towards the setpoint $y_{set}$. The feedback controller 1901 may follow one of various feedback control approaches, for example proportional-integral-derivative control.

The feedback controller 1901 provides the input u to the performance circuit 1902 (e.g., directly from the feedback controller 1901, via the BMS controller 366). The performance circuit 1902 also obtains the measured output y (e.g., directly from the plant 602, via the feedback controller 1901, via the BMS controller 366). The performance circuit 1902 is configured to determine a self-optimizing control function using the input-output data (i.e., u and y) for multiple time steps and use the self-optimizing control function to calculate and monitor values of a self-optimizing control variable over time to assess system performance and/or to detect faults in the operation of the building equipment. The performance circuit 1902 is shown in detail in FIG. 20 and described in detail below with reference thereto.

Figure 20:
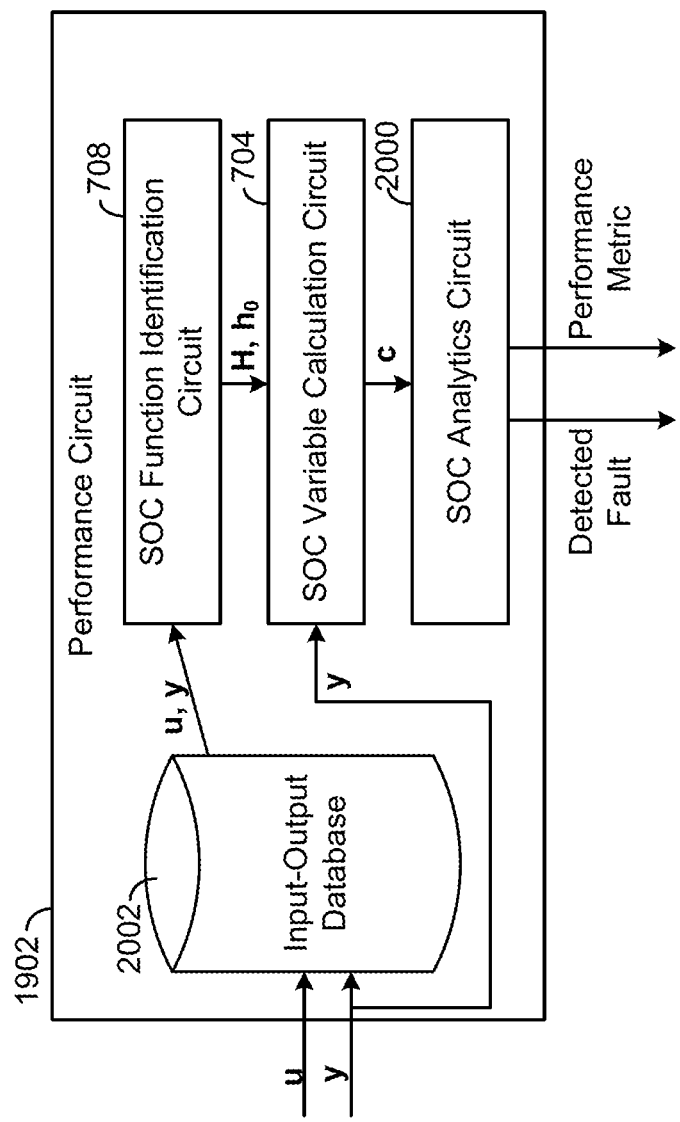
FIG. 20 is a block diagram of an analytics circuit of the building management system of FIG. 19, according to some embodiments.

Referring now to FIG. 20, a detailed view of the performance circuit 1902 is shown, according to some embodiments. The performance circuit 1902 is shown to include an input-output database 2002, the self-optimizing control (SOC) function identification circuit 708, the SOC variable calculation circuit 704, and a SOC analytics circuit 2000, communicably coupled to one another.

As illustrated by FIG. 20, the performance circuit 1902 receives input u and output y from the feedback controller 1901 for each time step (e.g., every minute, every fifteen minutes, every hour, etc.). The performance circuit 1902 stores the inputs and outputs in the input-output database 2002. The inputs and outputs are collected as a dataset that includes input and output data for the plant 602 for multiple time steps, i.e., for a training period.

In some embodiments, the performance circuit 1902 modifies the inputs provided by the feedback controller 1901 to the building equipment to perform a test to facilitate generation of the dataset. For example, the SOC function identification circuit 708 may operate as described with reference to FIG. 9 to generate a series of modified inputs to perform a step test. In other words, the performance circuit 1902 may be configured to generate the dataset stored in the input-output database 2002 using the approach described above with reference to FIG. 8.

The SOC function identification circuit 708 is configured to use the dataset from the input-output database 2002 to identify a self-optimizing control function. The SOC function identification circuit 708 is configured as described above, for example to follow the process of FIGS. 8-9. In the embodiments described herein, the SOC function identification circuit 708 identifies values for a matrix H and values for a vector $h_0$ to define a SOC variable c as $c=h_0+H\Delta y$. That is, the SOC function identification circuit 708 identifies a SOC function to define one or more SOC variables that could be used for online, self-optimizing, feedback control as described above with reference to FIGS. 6-18.

The SOC variable calculation circuit 704 receives the SOC function (e.g., matrix H and vector $h_0$) from the SOC function identification circuit 708. The SOC variable calculation circuit 704 also receives a current value of the output y from the plant 602 (e.g., via the input-output database 2002). The SOC variable calculation circuit 704 then applies the SOC function to the output to determine a value of the SOC variable c. In the examples herein, the SOC variable calculation circuit 704 calculates c as $c=h_0+H\Delta y$. The SOC variable calculation circuit 704 can repeatedly receive an updated output (i.e., the output for a current time) and repeatedly calculate a new (i.e., current) value of the SOC variable.

The SOC analytics circuit 2000 receives the value (i.e., a current value) of the SOC variable from the SOC variable calculation circuit 704. Over time, the SOC analytics circuit 2000 receives a series of current values of the SOC variable. The SOC analytics circuit 2000 uses the value(s) to generate an output indicative of the performance of the building equipment relative to optimal performance of the building equipment.

As described in detail above, the SOC function is determined such that optimal performance of the building equipment corresponds to a zero value of the SOC variable (i.e., c=0). Accordingly, deviation of the value of the SOC variable from zero indicates deviation from optimal performance. The SOC analytics circuit 2000 can assess performance of the building equipment by analyzing the absolute value (or, where the SOC variable is a vector, a norm (e.g., length)) of the SOC variable and/or a change in the values of the SOC variable over time.

For example, in some embodiments the SOC analytics circuit 2000 is configured to calculate a performance metric based on the values of the SOC variable over time. For example, an average value of a norm of the SOC variable may be used as an indicator of average deviation from optimal performance. Various other statistical analyses of the SOC variable are possible. In such embodiments, the SOC analytics circuit 2000 may generate a graphical representation of the performance metric and cause the graphical representation to be displayed on a screen of a user device (e.g., a client device 504, laptop, desktop computer, smartphone, tablet, room thermostat display, etc.).

In some embodiments, the SOC analytics circuit 2000 is configured to detect faults using the values of the SOC variable. Deviation of the system from optimal performance may be caused by a fault at a device, sensor, mechanism, etc. of the building equipment. In such a case, deviation of the SOC variable from zero or near zero (i.e., movement of an absolute value or norm of the SOC beyond a threshold value) can indicate that a fault has occurred. Accordingly, the SOC analytics circuit 2000 is configured to monitor the SOC variable over time and to detect a fault based on a value of the SOC variable. For example, the SOC analytics circuit 2000 can calculate a norm (e.g., absolute value, positive length, etc.) of the SOC variable, compare the norm to a threshold value, and generate an indication that a fault has occurred in response to determining that the norm exceeds the threshold value. In some embodiments, the SOC analytics circuit 2000 determines that a fault has occurred when the norm is greater than the threshold value for more than a threshold duration. The threshold value and/or the threshold duration can be automatically defined based on statistical properties of the SOC variable (e.g., based on a standard deviation of the absolute value or norm).

Figure 21:
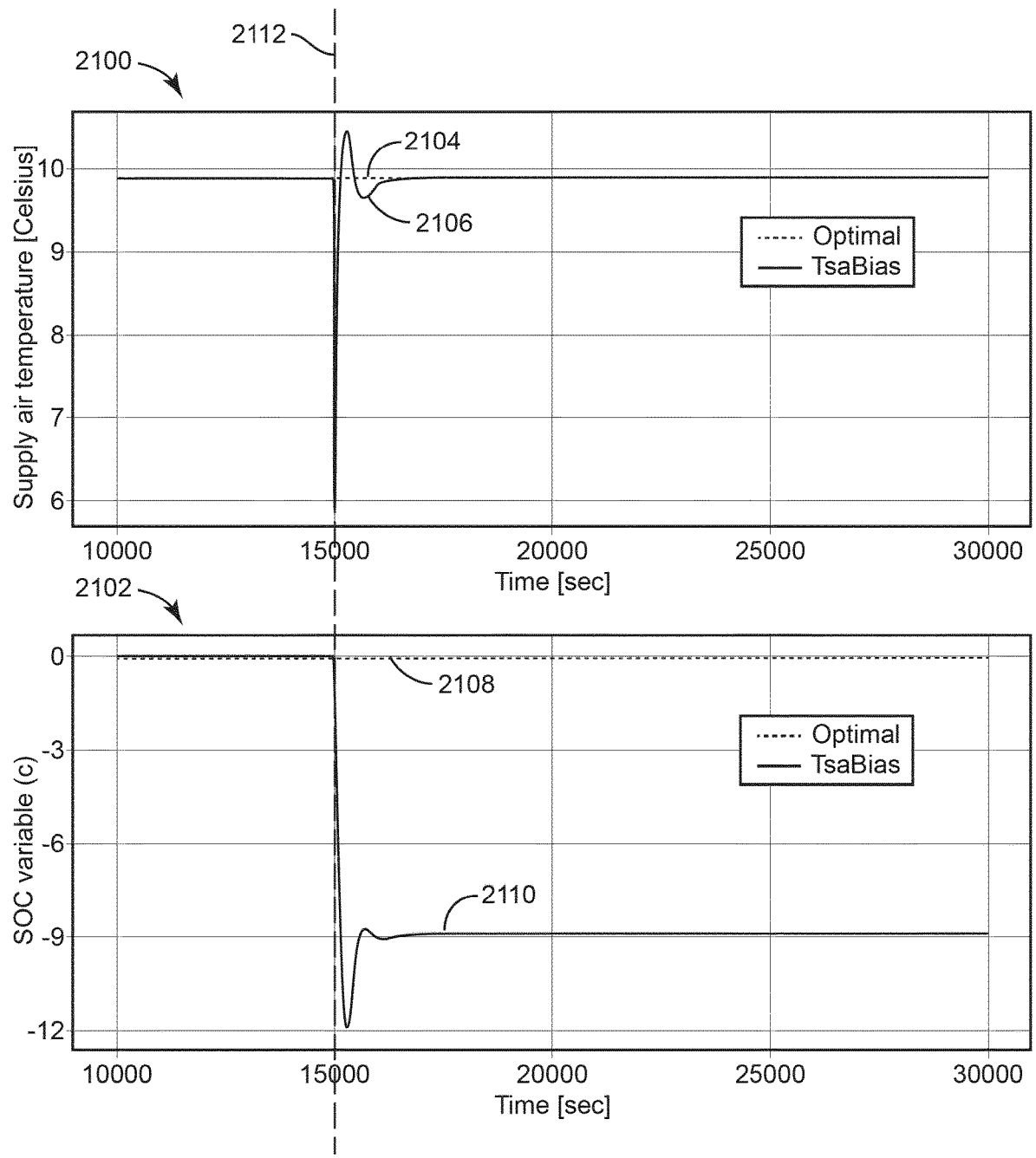
FIG. 21 is a pair of graphs that illustrate an example fault detection that can be achieved by the building management system of FIG. 19, according to some embodiments.

An example of fault detection as executed by the SOC analytics circuit 2000 is illustrated by FIG. 21. FIG. 21 illustrates results of an example experiment using the VAV system as in FIG. 10. FIG. 21 shows a first graph 2100 that charts the supply air temperature over time, with a first line 2104 that charts supply air temperature in the optimal condition (i.e., at a setpoint supply air temperature) and a second line 2106 that charts supply air temperature as measured by a supply air temperature sensor. FIG. 21 shows a second graph 2102 that charts the SOC variable over time, including a third line 2108 that shows the optimal value of the SOC variable (equal to zero) and a fourth line 2110 that shows the actual value of the SOC variable.

In the example shown in FIG. 21, a sensor fault occurs at the time step indicated by the vertical dotted line 2112. The sensor fault causes the supply air temperature sensor to provide an incorrect value. As shown by the first graph 2100, the feedback control system quickly compensates for the offset (error) of the supply air temperature sensor and controls the supply air temperature to make the incorrect measurement provided by the supply air temperature sensor to match the optimal/setpoint value. Because the first line 2104 and the second line 2106 quickly converge following the fault, it may be difficult or impossible to detect occurrence of the sensor fault by looking at the measurements of the supply air temperature.

However, as shown by the second graph 2102, the value of the SOC variable changes significantly following the sensor fault. As illustrated by the fourth line 2110, the value of the SOC value deviates noticeably from zero. The SOC analytics circuit 2000 can determine that a fault has occurred based on that deviation. Using a SOC variable and function for fault detection can therefore make it possible to detect faults that may otherwise be masked by the behavior of the system (e.g., as for the first graph 2100). Additionally, because a baseline/optimal value is inherently zero for the SOC variable, any difficulty in determining a baseline/optimal value is avoided.

Referring to FIGS. 19-21, the performance circuit 1902 can generate an indication of the performance of the building equipment, for example a performance metric or an indication of a detected fault. The performance metric or the detected fault can be included in a graphical user interface generated by the BMS 1900 and provided to a user via a user device. In some embodiments, the BMS circuit 366 automatically modifies operation of the building equipment in response to the indication, for example to compensate for a detected fault or to generate data that can be used for automated fault diagnosis. That is, the detected fault can trigger expanded data gathering and/or expanded data logging to generate and collect data that can be used for further analysis of the detected fault (e.g., to determine a cause or source of the fault). For example, control inputs may be varied to perform various input-output tests (e.g., to determine whether an expected response occurs to a selected input). In such embodiments, the indication output by the performance circuit 1902 is used in automated control of the building equipment.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system comprising:
   building equipment configured to operate in accordance with an input to alter a variable state or condition of a building;
   a feedback controller configured to generate the input as a function of a measured state of the building equipment;
   an analytics circuit configured to:
      obtain and store a dataset comprising the measured state of the building equipment and the input for a plurality of time steps;
      determine, based on at least a portion of the dataset, a self-optimizing control function that defines a self-optimizing control variable as a function of the measured state of the building equipment;
      calculate a value of the self-optimizing control variable using the self-optimizing control function and the measured state;
      monitor the value of the self-optimizing control variable over time; and
      generate an indication of performance of the building equipment relative to optimal performance based on the value of the self-optimizing control variable.

2. The building management system of claim 1, wherein the feedback controller is configured to modify an operation of the building equipment in response to the indication.

3. The building management system of claim 1, comprising a display device configured to receive the indication and display a graphical representation of the indication to a user.

4. The building management system of claim 1, wherein:
   the analytics circuit is configured to detect a fault based on a change in the value of the self-optimizing control variable; and
   the indication comprises information relating to the fault.

5. The building management system of claim 1, wherein the analytics circuit is configured to determine that the building equipment are performing optimally in response to the self-optimizing control variable having a value of substantially zero.

6. The building management system of claim 1, wherein:
   operating the building equipment incurs a cost defined by a cost function of the input; and
   the analytics circuit is configured to determine the self-optimizing control function such that the self-optimizing control variable represents a derivative of the cost function with respect to the input.

7. The building management system of claim 1, wherein the self-optimizing control function comprises multiplying the measured state by a matrix and adding an offset vector; and
   wherein the analytics circuit is configured to determine values of elements of the matrix and the offset vector using a non-optimal reference.

8. A method of operating building equipment, comprising:
   operating building equipment in accordance with an input to alter a variable state or condition of a building;
   generating the input as a function of a measured state of the building equipment;
   providing the input to the building equipment;
   obtaining and storing a dataset comprising the measured state of the building equipment and the input for a plurality of time steps;
   determining, based on at least a portion of the dataset, a self-optimizing control function that defines a self-optimizing control variable as a function of the measured state of the building equipment;
   calculating a value of the self-optimizing control variable using the self-optimizing control function and the measured state;
   monitoring the value of the self-optimizing control variable over time; and
   generating an indication of performance of the building equipment relative to optimal performance based on the value of the self-optimizing control variable.

9. The method of claim 8, comprising modifying an operation of the building equipment in response to the indication.

10. The method of claim 8, comprising displaying a graphical representation of the indication on a display screen.

11. The method of claim 8, comprising detecting a fault based on a change in the value of the self-optimizing control variable;
wherein the indication comprises information relating to the fault.

12. The method of claim 8, comprising determining that the building equipment are performing optimally in response to calculating a zero value of the self-optimizing control variable.

13. The method of claim 8, wherein:
operating the building equipment incurs a cost defined by a cost function of the input; and
determining the self-optimizing control function comprises defining the self-optimizing control variable as a derivative of the cost function with respect to the input.

14. The method of claim 8, wherein the self-optimizing control function comprises multiplying the measured state by a matrix and adding an offset vector; and
wherein determining the self-optimizing control function comprises determining values of elements of the matrix and the offset vector using a non-optimal reference.

15. One or more non-transitory computer-readable media containing program instructions that, when executed by one or more processors, cause the one or more processors to perform operations comprising:
obtaining a dataset comprising a measured state of building equipment for a plurality of time steps and an input to the building equipment for the plurality of time steps, the building equipment configured to operate as controlled by the input;
determining, based on at least a portion of the dataset, a self-optimizing control function that defines a self-optimizing control variable as a function of the measured state of the building equipment;
obtaining a current value of the measured state of the building equipment;
calculating a value of the self-optimizing control variable using the function and the current value of the measured state;
generating an indication of performance of the building equipment relative to optimal performance based on the value of the self-optimizing control variable; and
one or more of:
modifying an operation of the building equipment in response to the indication; or
generating a graphical representation of the indication and causing the graphical representation to be displayed by a user device.

16. The non-transitory computer-readable media of claim 15, the operations further comprising detecting a fault based on a change in the value of the self-optimizing control variable;
wherein the indication comprises information relating to the fault.

17. The non-transitory computer-readable media of claim 16, wherein detecting the fault comprises determining that the current value of the self-optimizing control variable has an absolute value exceeding a threshold value.

18. The non-transitory computer-readable media of claim 15, wherein:
operating the building equipment incurs a cost defined by a cost function of the input; and
determining the self-optimizing control function comprises defining the self-optimizing control variable to be a derivative of the cost function with respect to the input.

19. The non-transitory computer-readable media of claim 15, wherein the self-optimizing control function comprises multiplying the measured state by a matrix and adding an offset vector; and
wherein determining the self-optimizing control function comprises determining values of elements of the matrix and the offset vector using a non-optimal reference.

20. The non-transitory computer-readable media of claim 15, wherein obtaining the dataset comprises conducting a test by:
generating a modified input for each of the plurality of time steps; and
controlling the building equipment to operate in accordance with the modified input.

* * * * *